(12) United States Patent
Nagatani et al.

(10) Patent No.: US 9,428,215 B1
(45) Date of Patent: Aug. 30, 2016

(54) STEERING SYSTEM

(71) Applicant: JTEKT CORPORATION, Osaka-shi, Osaka (JP)

(72) Inventors: Atsumune Nagatani, Kashihara (JP); Masayoshi Sakuda, Kashihara (JP); Yu Myohoji, Habikino (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/081,455

(22) Filed: Mar. 25, 2016

(30) Foreign Application Priority Data

Mar. 31, 2015  (JP) ................................. 2015-072431
Aug. 21, 2015  (JP) ................................. 2015-163851

(51) Int. Cl.
*B62D 1/16* (2006.01)
*B62D 1/19* (2006.01)

(52) U.S. Cl.
CPC ..................................... *B62D 1/195* (2013.01)

(58) Field of Classification Search
USPC ................... 280/775, 777; 74/492, 493, 495
See application file for complete search history.

(56) References Cited

U.S. PATENT DOCUMENTS

| | | | | |
|---|---|---|---|---|
| 5,161,425 A * | 11/1992 | Baskett | ................. | B62D 1/184 280/775 |
| 6,799,486 B2 * | 10/2004 | Manwaring | ............ | B62D 1/195 280/777 |
| 8,375,822 B2 | 2/2013 | Ridgway et al. | | |
| 8,827,311 B2 * | 9/2014 | Schnitzer | ............... | B62D 1/184 188/371 |
| 9,108,673 B2 * | 8/2015 | Streng | .................... | B62D 1/195 |
| 2006/0090586 A1 * | 5/2006 | Lee | ......................... | B62D 1/184 74/492 |
| 2009/0013817 A1 * | 1/2009 | Schnitzer | ............... | B62D 1/184 74/493 |
| 2009/0229400 A1 * | 9/2009 | Ozsoylu | ................. | B62D 1/184 74/498 |
| 2009/0282945 A1 * | 11/2009 | Streng | .................... | B62D 1/184 74/493 |
| 2010/0275721 A1 * | 11/2010 | Davies | ................... | B62D 1/184 74/493 |
| 2012/0304797 A1 * | 12/2012 | Tinnin | ................... | B62D 1/184 74/493 |
| 2015/0203145 A1 * | 7/2015 | Sugiura | ................. | B62D 1/189 74/493 |
| 2016/0144886 A1 * | 5/2016 | Tomiyama | ............. | B62D 1/187 74/493 |

* cited by examiner

*Primary Examiner* — Toan To
(74) *Attorney, Agent, or Firm* — Oliff PLC

(57) ABSTRACT

A steering system includes a second tooth defining member and an energy absorbing unit. The energy absorbing unit includes energy absorbing portions each including a first portion extending upward in a column axial direction from a restraining portion restrained in the column axial direction and a second portion formed by folding back the energy absorbing portion at a fold-back portion, the energy absorbing portions being separated from each other in a first orthogonal direction, and a coupling portion that couples the second portions together and moves together with the second tooth defining member at the time of the secondary collision. At the time of the secondary collision, the energy absorbing portions allow the fold-back portions to move downward in the column axial direction to absorb impact energy while guiding downward movement of the second tooth defining member in the column axial direction between facing edges of the energy absorbing portions.

4 Claims, 16 Drawing Sheets

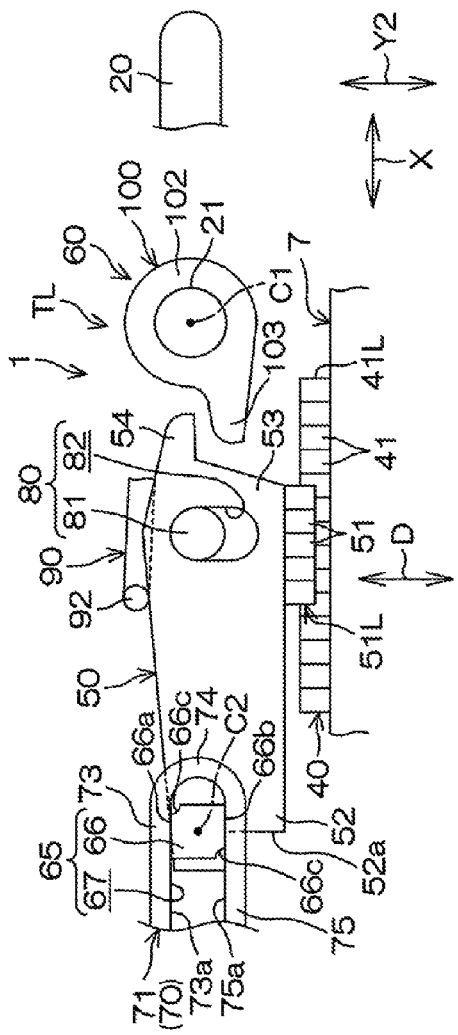
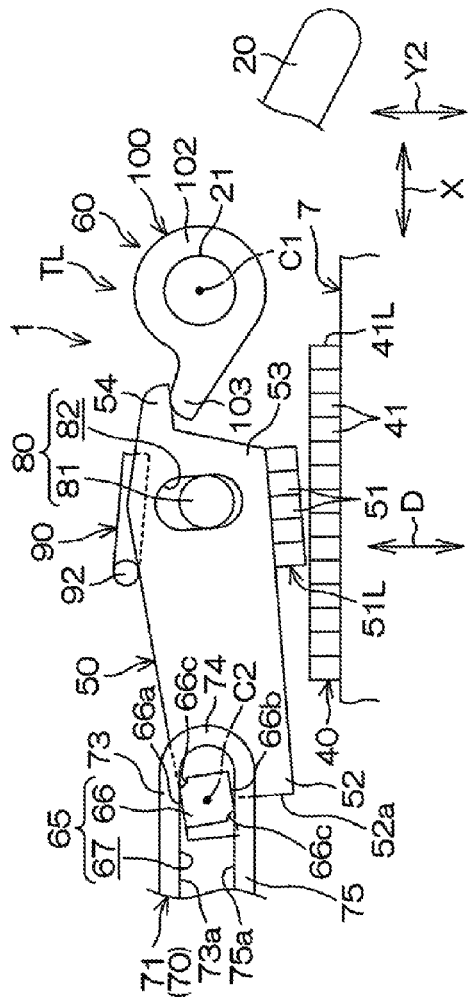

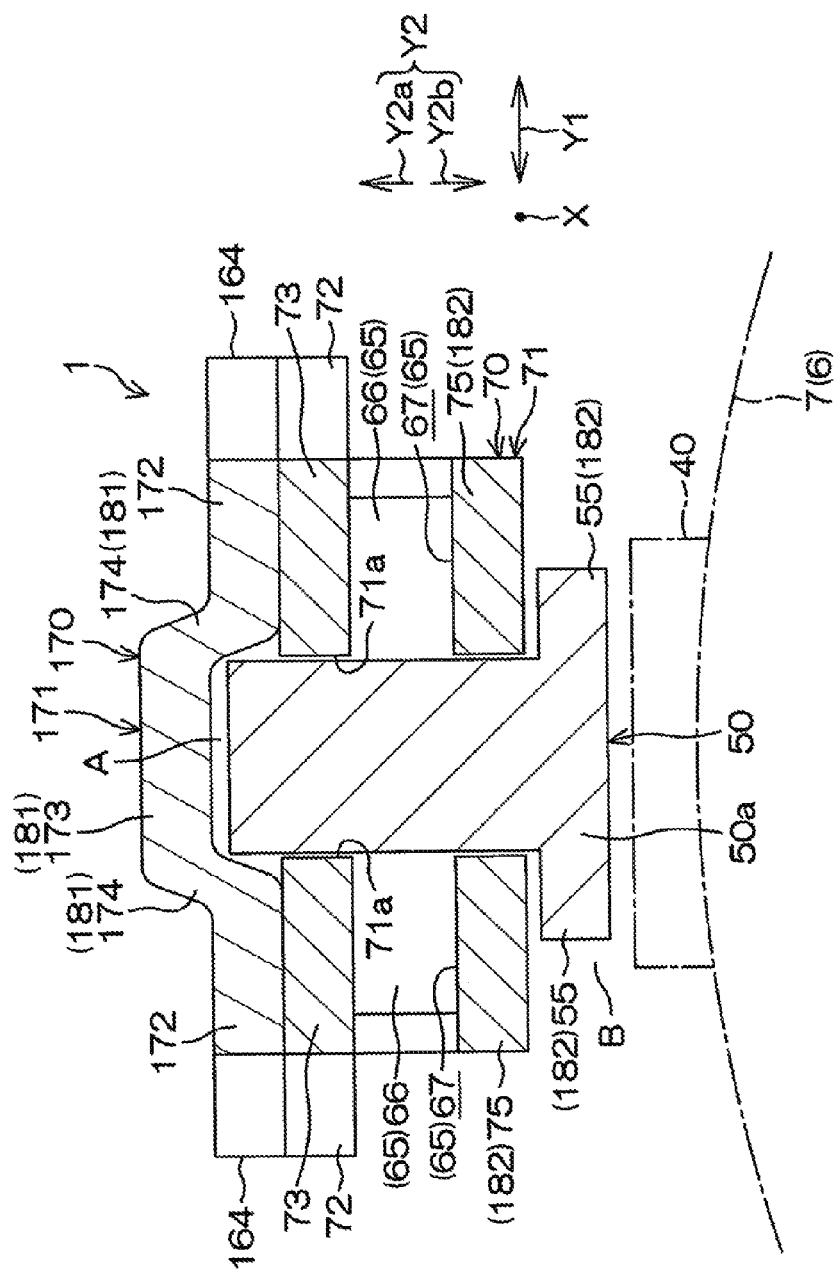

STEERING SYSTEM

INCORPORATION BY REFERENCE

The disclosure of Japanese Patent Applications No. 2015-072431 filed on Mar. 31, 2015 and No. 2015-163851 filed on Aug. 21, 2015 including the specification, drawings and abstract, is incorporated herein by reference in its entirety.

BACKGROUND OF THE INVENTION

1. Field of the Invention

The invention relates to a steering system.

2. Description of the Related Art

A steering column described in U.S. Pat. No. 8,375,822 includes an outer jacket and an inner jacket slidably arranged in the outer jacket. A first portion of an energy absorbing strap is stuck to the inner jacket. Teeth of a second portion of the energy absorbing strap come into meshing engagement with teeth of a locking cam supported by the outer jacket. The energy absorbing strap has a U-shaped portion arranged between the first portion and the second portion and around a tubular mandrel attached to an end of the inner jacket. At the time of a vehicle collision, the energy absorbing strap is pulled between the inner jacket and the outer jacket. At this time, the energy absorbing strap is deformed so as to make the first portion longer than the second portion.

In a steering system having an energy absorbing unit including an energy absorbing portion such as the energy absorbing strap described in U.S. Pat. No. 8,375,822, the energy absorbing strap and the locking cam, which has the teeth coming into meshing engagement with the teeth of the second portion, are arranged so as to overlap. Thus, the layout of the energy absorbing unit has a low degree of freedom, possibly precluding effective use of spaces around the energy absorbing unit.

SUMMARY OF THE INVENTION

An object of the invention is to provide a steering system that allows an energy absorbing portion to be deformed while effectively utilizing spaces.

In an aspect of the invention, a steering system includes a steering shaft that is configured to contract and extend in a column axial direction, a column jacket that includes a lower jacket and an upper jacket fitted to the lower jacket and that supports the steering shaft so that the steering shaft is rotatable, the column jacket being configured to contract and extend in the column axial direction, a first tooth defining member having a plurality of first teeth such that the first teeth are arranged in the column axial direction, the first tooth defining member moving together with the upper jacket, a support shaft that is supported by the lower jacket or a member supported by the lower jacket and that extends in an orthogonal direction orthogonal to the column axial direction, a second tooth defining member that has second teeth configured to come into meshing engagement with the first teeth, that is supported by the support shaft so as to be rotatable around a central axis of the support shaft, and that is detached, at a time of a secondary collision, from the lower jacket with the second teeth kept in meshing engagement with the first teeth, and an energy absorbing unit including a pair of energy absorbing portions each including a restraining portion restrained in the column axial direction by the lower jacket, a first portion extending upward from the restraining portion in the column axial direction, a fold-back portion, and a second portion formed by folding back the energy absorbing portion at the fold-back portion, the energy absorbing portions being separated from each other in the orthogonal direction, and a coupling portion that couples the second portions of the energy absorbing portions together and that moves together with the second tooth defining member at the time of the secondary collision. At the time of the secondary collision, the energy absorbing portions allow the fold-back portions to move downward in the column axial direction to absorb impact energy while guiding downward movement of the second tooth defining member in the column axial direction between facing edges of the energy absorbing portions.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 6A and 6B are schematic side views of the tooth locking mechanism, FIG. 6A depicts a meshing engagement state, and FIG. 6B depicts a meshing engagement released state;

FIG. 9A depicts a state before a secondary collision, FIG. 9B depicts a state immediately after the second tooth defining member and a coupling portion come into abutting contact with each other as a result of the secondary collision, and FIG. 9C depicts a state after movement of fold-back portions in the column axial direction as a result of the secondary collision;

FIG. 21 is a sectional view taken along line XXI-XXI in FIG. 20.

DETAILED DESCRIPTION OF EMBODIMENTS

Figure 1:
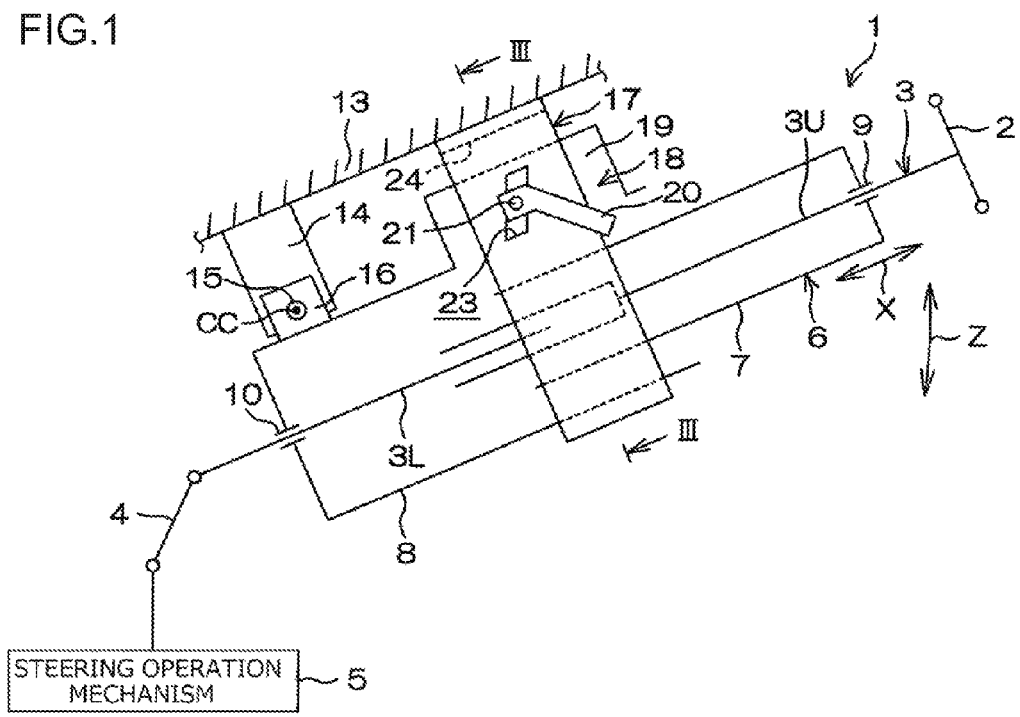
FIG. 1 is a schematic side view of a steering system in an embodiment of the invention.

An embodiment of the invention will be described below in detail with reference to the attached drawings. FIG. 1 is a schematic side view of a steering system 1 according to an embodiment of the invention. As seen in FIG. 1, the steering system 1 includes a steering shaft 3 and a steering operation mechanism 5. An end (axially upper end) of the steering shaft 3 is coupled to a steering member 2 such as a steering wheel. The steering operation mechanism 5 is coupled to the steering shaft 3 via an intermediate shaft 4 and the like.

The steering operation mechanism 5 is, for example, a rack-and-pinion mechanism that turns steered wheels (not depicted in the drawings) in conjunction with steering of the steering member 2. Rotation of the steering member 2 is transmitted to the steering operation mechanism 5 via the steering shaft 3, the intermediate shaft 4, and the like. The rotation transmitted to the steering operation mechanism 5 is converted into axial movement of a rack shaft not depicted in the drawings. Consequently, the steered wheels are turned.

The steering shaft 3 has a tubular upper shaft 3U and a tubular lower shaft 3L that are fitted together by, for example, spline fitting or serration fitting so as to be slidable relative to each other. The steering member 2 is coupled to an end of the upper shaft 3U. The steering shaft 3 can contract and extend in a column axial direction X. The steering system 1 includes a hollow column jacket 6 that supports the steering shaft 3 so that the steering shaft 3 is rotatable. The column jacket 6 includes an upper jacket 7 and a lower jacket 8. The upper jacket 7 is a tubular inner jacket. The lower jacket 8 is a tubular outer jacket fitted over the upper jacket 7.

The steering shaft 3 is inserted into the column jacket 6 and rotatably supported by the column jacket 6 via a plurality of bearings 9 and 10. The upper jacket 7 is coupled to the upper shaft 3U via the bearing 9 so as to be movable in the column axial direction X in conjunction with the upper shaft 3U. The lower jacket 8 supports the lower shaft 3L via the bearing 10 so that the lower shaft 3L is rotatable. The upper jacket 7 moves in the column axial direction X with respect to the lower jacket 8. Consequently, the column jacket 6 can contract and extend in the column axial direction X along with the steering shaft 3.

The steering system 1 includes a fixed bracket 14, a tilt center shaft 15, and a column bracket 16. The fixed bracket 14 is fixed to a vehicle body 13. The tilt center shaft 15 is supported by the fixed bracket 14. The column bracket 16 is fixed to an outer periphery of the lower jacket 8 and rotatably supported by the tilt center shaft 15. The column jacket 6 and the steering shaft 3 can pivot (is tiltable) in a tilt direction Z using, as a support, a tilt center CC that is a central axis of the tilt center shaft 15.

The position of the steering member 2 can be adjusted by pivoting (tilting) the steering shaft 3 and the column jacket 6 around the tilt center CC (tilt adjustment). The position of the steering member 2 can be adjusted by contracting or extending the steering shaft 3 and the column jacket 6 in the column axial direction X (telescopic adjustment).

Figure 2:
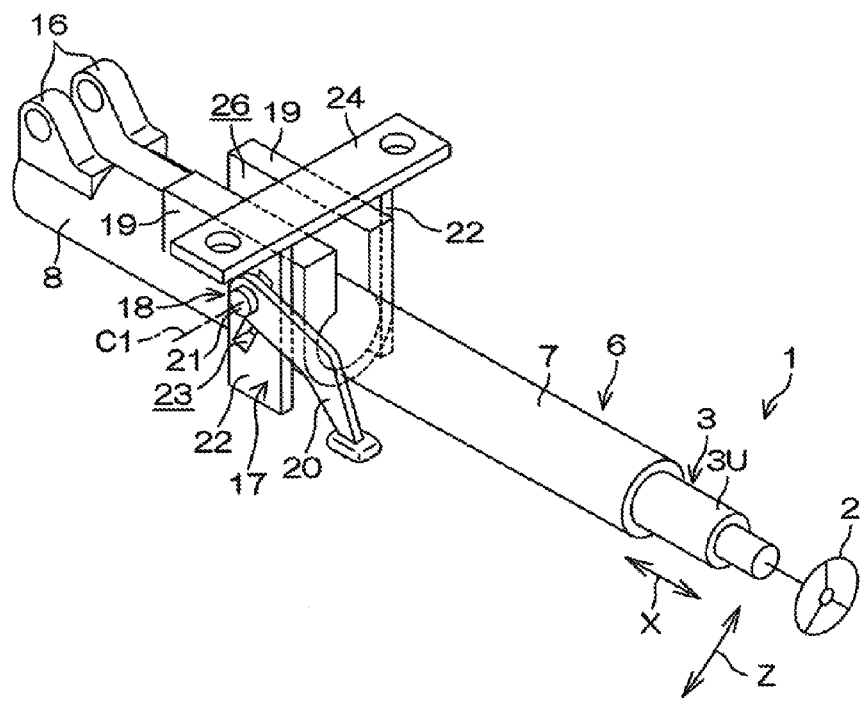
FIG. 2 is a schematic perspective view of the steering system.

The steering system 1 includes a bracket 17 and a clamping mechanism 18. The bracket 17 includes an attachment plate 24 fixed to the vehicle body 13. The clamping mechanism 18 achieves tilt locking and telescopic locking by clamping a pair of clamped portions 19 integrated with an upper portion of the lower jacket 8 in the column axial direction X. As depicted in FIG. 1 and FIG. 2 that is a schematic perspective view of the steering system 1, the clamping mechanism 18 includes a clamping shaft 21 and an operation lever 20. The clamping shaft 21 is inserted through tilting slots 23 in the bracket 17 to clamp the clamped portions 19. The operation lever 20 is an operation member that rotates the clamping shaft 21. A central axis C1 of the clamping shaft 21 corresponds to a center of rotation of the operation lever 20.

Figure 3:
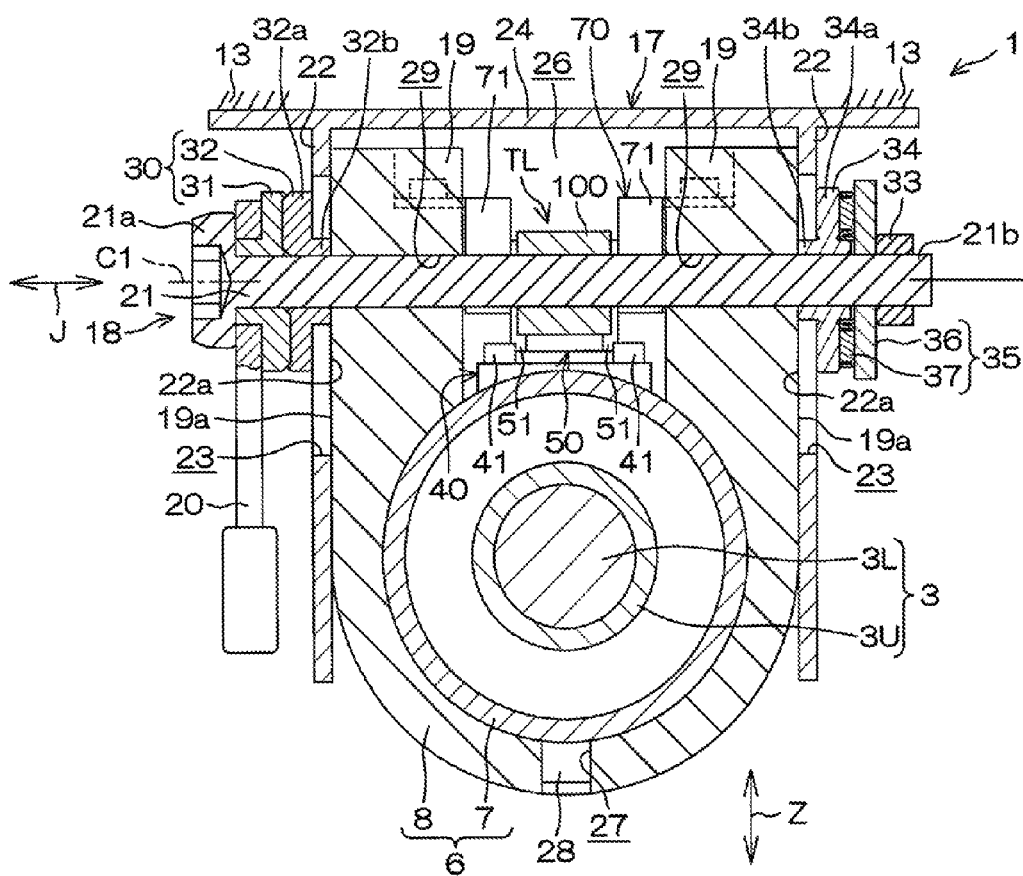
FIG. 3 is a sectional view of the steering system corresponding to a sectional view taken along line III-III in FIG. 1.

As depicted in FIG. 2, the lower jacket 8 includes a slit 26 extending downward from its an upper end in the column axial direction X. The clamped portions 19 are arranged on opposite sides of the slit 26. Clamping the clamped portions 19 enables the lower jacket 8 to be elastically reduced in diameter. FIG. 3 is a sectional view taken along line III-III in FIG. 1. As depicted in FIG. 3, the bracket 17 includes the attachment plate 24 and a pair of side plates 22. The attachment plate 24 is attached to the vehicle body 13. The side plates 22 extend downward from the opposite ends of the attachment plate 24 in the tilt direction Z.

The lower jacket 8 has a guide groove 27 extending in the column axial direction X. A guided protrusion 28 fixed to the upper jacket 7 is fitted in the guide groove 27. The guide groove 27 allows axial movement of the upper jacket 7 to be guided and regulates rotation of the upper jacket 7 with respect to the lower jacket 8. An end (not depicted in the drawings) of the guide groove 27 in the column axial direction X comes into abutting contact with the guided protrusion 28. This prevents the upper jacket 7 from slipping out from the lower jacket 8.

The clamped portions 19 of the lower jacket 8 are arranged between the side plates 22 and shaped like plates each extending along an inner surface 22a of the corresponding side plate 22. The inner surfaces 22a of the side plates 22 each face an outer surface 19a of the corresponding clamped portion 19. The clamping shaft 21 is a bolt inserted through the tilting slots 23 in the side plates 22 of the bracket 17 and through clamping shaft insertion holes 29 in the clamped portions 19 of the lower jacket 8. A large-diameter head portion 21a provided at one end of the clamping shaft 21 is fixed to the operation lever 20 so as to be rotatable together with the operation lever 20. The clamping mechanism 18 is interposed between the head portion 21a of the clamping shaft 21 and one of the side plates 22. The clamping mechanism 18 further includes a force conversion mechanism 30 that converts an operation torque of the operation lever 20 into an axial force of the clamping shaft 21 (a clamping force needed to clamp the side plates 22).

The force conversion mechanism 30 includes a rotation cam 31 and a first clamping member 32. The rotation cam 31 is coupled to the operation lever 20 so as to be rotatable together with the operation lever 20. Movement of the rotation cam 31 with respect to the clamping shaft 21 is regulated in a clamping shaft direction J that is a direction in which a central axis of the clamping shaft 21 extends. The first clamping member 32 is a non-rotation cam that cam-engages with the rotation cam 31 to clamp a corresponding one of the side plates 22. The clamping mechanism 18 further includes a nut 33, a second clamping member 34, and an interposition member 35. The nut 33 is screw-threaded on a threaded portion 21b of the other end of the clamping shaft 21. The second clamping member 34 clamps the other side plate 22. The interposition member 35 is interposed between the second clamping member 34 and the nut 33. The interposition member 35 includes a washer 36 and a needle roller bearing 37.

The second clamping member 34 and the interposition member 35 are interposed between the nut 33 and the other side plate 22 of the bracket 17. The rotation cam 31, the first clamping member 32 (non-rotation cam), the second clamping member 34, and the interposition member 35 are supported by an outer periphery of the clamping shaft 21. The first clamping member 32 (non-rotation cam) and the second clamping member 34 have clamping plate portions 32a and 34a, respectively, that clamp the corresponding side plates 22, and boss portions 32b and 34b, respectively, that are fitted in the corresponding tilting slots 23. The fitting between the boss portions 32b and 34b and the corresponding tilting slots 23 regulates rotation of the clamping members 32 and 34.

The first clamping member 32 (non-rotation cam) and the second clamping member 34 are supported by the clamping shaft 21 so as to be movable in the clamping shaft direction J. In conjunction with rotation of the operation lever 20 in a locking direction, the rotation cam 31 rotates with respect to the first clamping member 32 (non-rotation cam). Consequently, the first clamping member 32 is moved in the clamping shaft direction J to clamp the side plates 22 of the bracket 17 between (the clamping plate portions 32a and 34a of) the clamping members 32 and 34.

Thus, the side plates 22 of the bracket 17 clamp the corresponding clamped portions 19 of the lower jacket 8. As a result, movement of the lower jacket 8 in the tilt direction Z is regulated to achieve tilt locking. Both clamped portions 19 are clamped to elastically reduce the lower jacket 8 in diameter to clamp the upper jacket 7. Consequently, movement of the upper jacket 7 in the column axial direction X is regulated to achieve telescopic locking. As described above, the clamping mechanism 18 achieves telescopic locking based on friction between the jackets 7 and 8.

Figure 4:
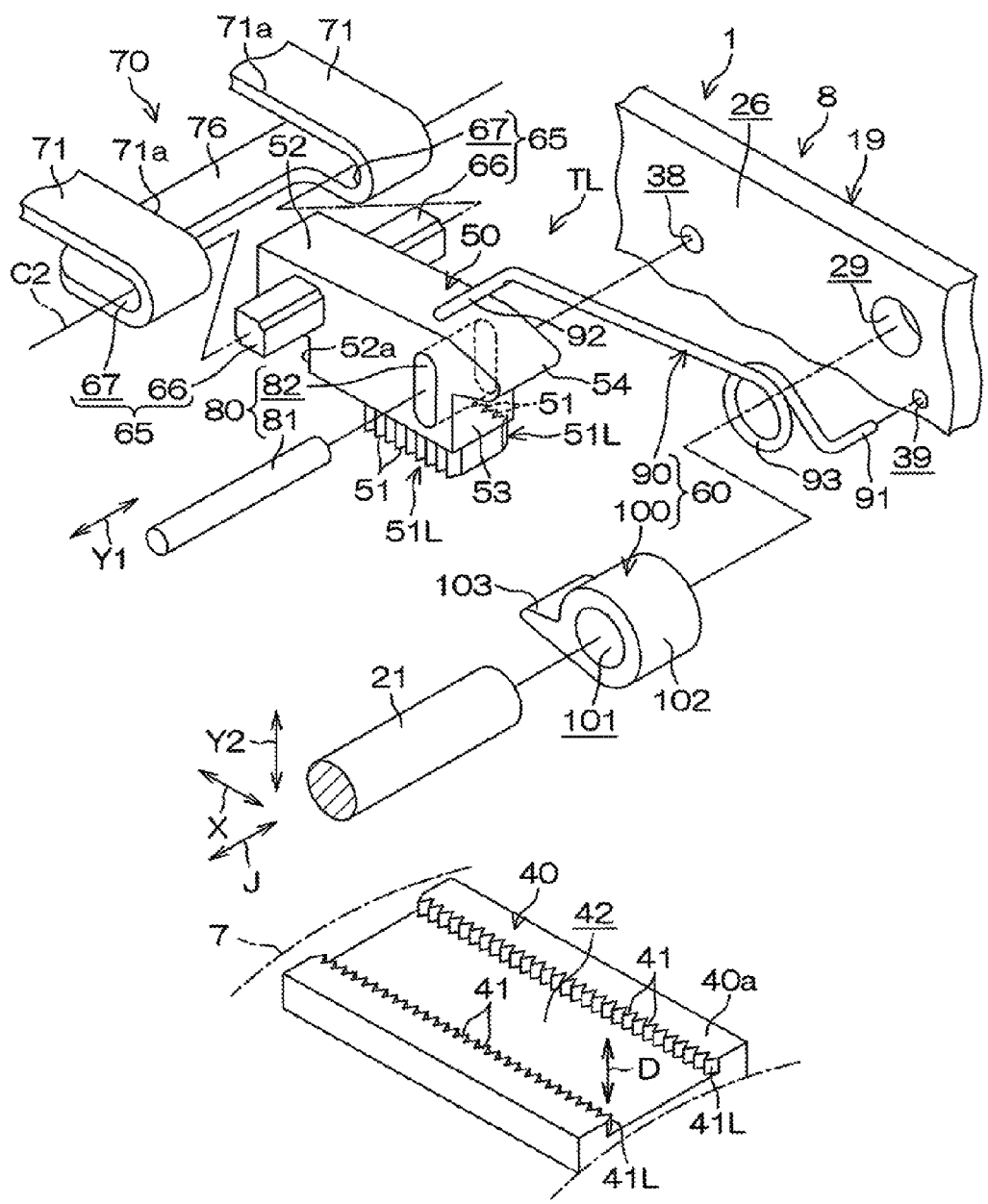
FIG. 4 is an exploded perspective view of a tooth locking mechanism and its periphery.

As depicted in FIG. 4, the steering system 1 further includes an energy absorbing unit 70 and a tooth locking mechanism TL. The energy absorbing unit 70 includes plate-like energy absorbing portions 71 that absorbs impact energy at the time of a secondary collision (EA: Energy Absorption). The tooth locking mechanism TL brings teeth into meshing engagement with one another during clamping by the clamping mechanism 18 in order to stabilize an initial restraint in a telescopic direction (corresponding to the column axial direction X) at the time of the secondary collision (in other words, in order to hold a telescopic position of the upper jacket 7 in an initial stage of the secondary collision).

Figure 5:
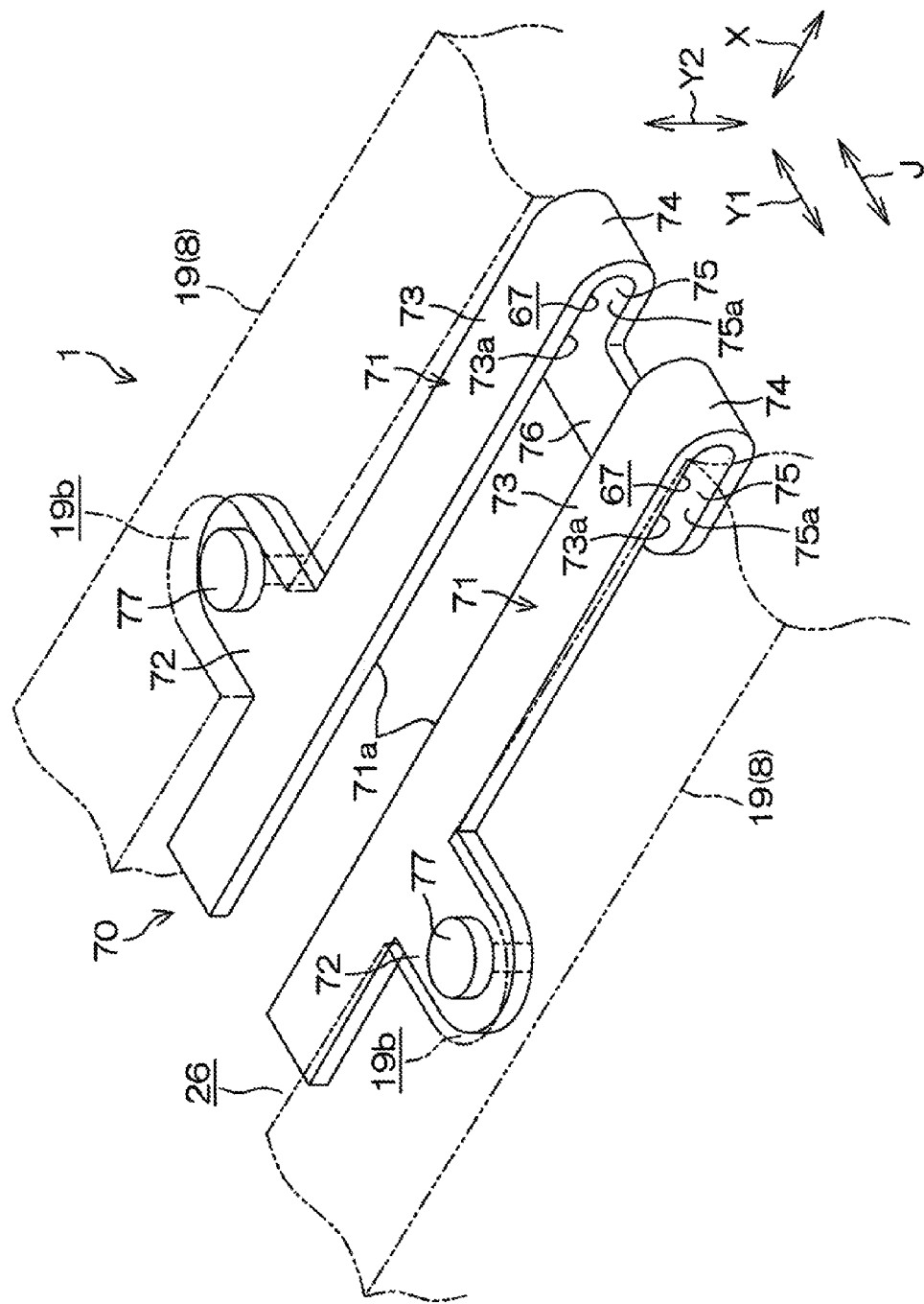
FIG. 5 is a schematic perspective view of an energy absorbing unit and its periphery.

As seen in FIG. 5 that is a schematic perspective view of a periphery of the energy absorbing unit 70, the energy absorbing unit 70 includes a pair of restraining portions 72 and a pair of energy absorbing portions 71. The restraining portions 72 are restrained in the column axial direction X by the lower jacket 8. The energy absorbing portions 71 are separate from each other in a first orthogonal direction Y1 that is an orthogonal direction orthogonal to the column axial direction X, and are deformed at the time of the secondary collision to absorb impact energy. The first orthogonal direction Y1 is a direction parallel to the clamping shaft direction J.

Each of the energy absorbing portions 71 includes a first portion 73, a curved fold-back portion 74, and a second portion 75. The first portion 73 extends upward from the restraining portion 72 in the column axial direction X. The second portion 75 is formed by folding back the energy absorbing portion 71 at the fold-back portion 74. The energy absorbing unit 70 includes a coupling portion 76. The coupling portion 76 couples the second portions 75 of the energy absorbing portions 71 together and move downward in the column axial direction X (a forward direction in a vehicle body that is a leftward direction in the sheet of FIG. 1) together with a second tooth defining member 50 described below (see FIG. 4).

Each of the restraining portions 72 is fixed, for example, with a bolt 77, to a recessed portion 19b formed in the corresponding clamped portion 19. Each of the energy absorbing portions 71 is supported by the corresponding clamped portion 19 via the corresponding restraining portion 72. The first portion 73 of each energy absorbing portion 71 is shaped like a plate that is flat in the column axial direction X. The second portion 75 of each energy absorbing portion 71 extends parallel to the corresponding first portion 73. The second portion 75 faces a part of the first portion 73.

As seen in FIG. 4 and FIG. 6A that is a schematic side view, the tooth locking mechanism TL includes a first tooth defining member 40, a second tooth defining member 50, and an interlocking mechanism 60. The first tooth defining member 40 has first teeth 41 and moves together with the upper jacket 7 in the column axial direction X. The second tooth defining member 50 has second teeth 51 that come into meshing engagement with the first teeth 41 and is rotatably supported around a support. The interlocking mechanism 60 interlocks motion of the clamping shaft 21 with rotation of the second tooth defining member 50.

Figure 7:
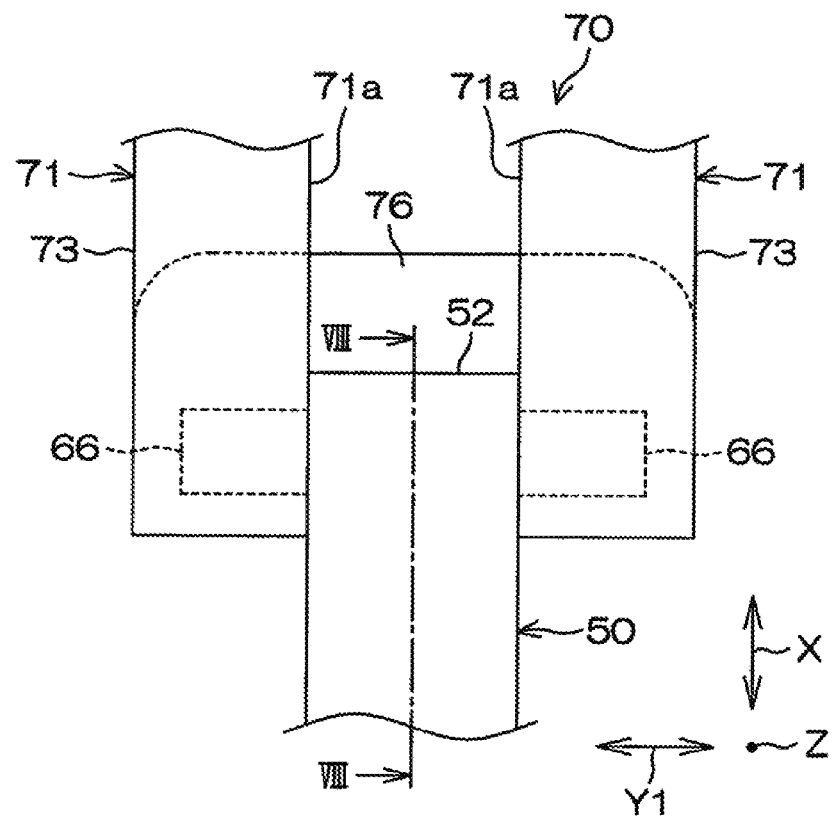
FIG. 7 is a diagram of a second tooth defining member and its periphery as viewed from above in a tilt direction.
Figure 8:
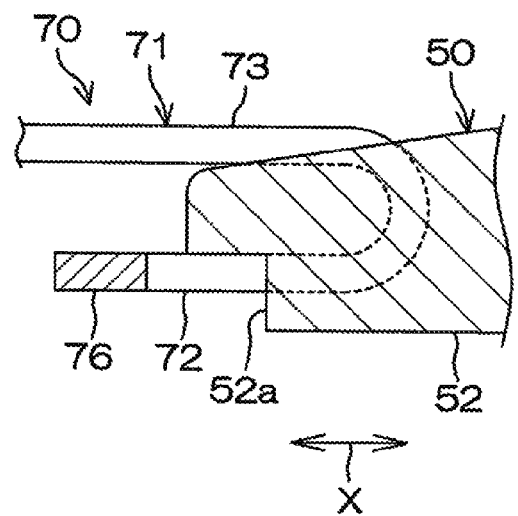
FIG. 8 is a sectional view taken along line VIII-VIII in FIG. 7.

The second tooth defining member 50 includes a supported portion 52 and a tooth defining portion 53. The supported portion 52 is rotatably supported around the support. The tooth defining portion 53 is located away from the supported portion 52 and has the second teeth 51. As depicted in FIG. 7 in which a periphery of the second tooth defining member 50 is viewed from above in a tilt direction Z, the supported portion 52 of the second tooth defining member 50 is arranged between facing edges 71a of the energy absorbing portions 71. As depicted in FIG. 8 that is a sectional view taken along line VIII-VIII in FIG. 7, the supported portion 52 has a facing surface 52a that faces an upper end, in the column axial direction X, of the coupling portion 76 of the energy absorbing unit 70 in the column axial direction X.

As depicted in FIG. 4 and FIG. 6A, the first tooth defining member 40 is formed using a plate material extending longitudinally in the column axial direction X. The first tooth defining member 40 is fixed to an outer peripheral surface of the upper jacket 7 by welding or the like. A recessed groove 42 extending in the column axial direction X is formed in a surface 40a of the first tooth defining member 40. The recessed groove 42 has a pair of inner wall surfaces extending in the column axial direction X and facing each other in the clamping shaft direction J. On the inner wall surfaces, a pair of first tooth rows 41L is formed such that each of the first tooth rows 41L includes a plurality of first teeth 41 arranged in the column axial direction X.

Tooth tips of the first teeth 41 of one of the first tooth rows 41L face tooth tips of the first teeth 41 of the other first tooth row 41L in the clamping shaft direction J. A tooth trace direction D (corresponding to a tooth width direction) of the first teeth 41 extends in a depth direction of the recessed groove 42 so as to be orthogonal both to the column axial direction X and to the clamping shaft direction J. The first tooth defining member 40 may be fixed to an outer peripheral surface of the upper jacket 7 by bolts or the like not depicted in the drawings. The first tooth defining member 40 may be formed integrally with the upper jacket 7 using a single material.

The tooth defining portion 53 is provided with a pair of second tooth rows 51L each with a plurality of second teeth 51 arranged on a surface of the tooth defining portion 53 facing the first tooth defining member 40. As depicted in FIG. 4, tooth tips of the second teeth 51 on the two second tooth rows 51L face laterally outward in the opposite directions. The second teeth 51 on each of the second tooth rows 51L can come into meshing engagement with the first teeth 41 on the corresponding first tooth row 41L in the tooth trace direction D.

The tooth locking mechanism TL includes support mechanisms 65 and a guide mechanism 80. Each of the support mechanisms 65 includes a support shaft 66 that supports the supported portion 52. The guide mechanism 80 guides the tooth defining portion 53 in the column axial direction X and a second orthogonal direction Y2 orthogonal to the first orthogonal direction Y1. The second orthogonal direction Y2 is a direction parallel to the tooth trace direction D. The support mechanism 65 includes a pair of the support shafts 66 and a pair of support holes 67. The support shafts 66 protrude from the supported portion 52 of the second tooth defining member 50 in opposite outward directions. Each of the support holes 67 is a slot defined by the first portion 73 and the second portion 75 of the corresponding energy absorbing portion 71 and extending in the column axial direction X.

Each support shaft 66 extends in the first orthogonal direction Y1. Each support shaft 66 is inserted though the corresponding support hole 67 and is supported by the corresponding energy absorbing portion 71, which is a member supported by the lower jacket 8. Specifically, the support shaft 66 is supported between the first portion 73 and the second portion 75 of the energy absorbing portion 71. The support shaft 66 is slidable through the corresponding support hole 67 in the column axial direction X.

The support shaft 66 is shaped generally like a rectangle having a pair of flat surfaces. The support shaft 66 has a central axis C2 as the support. As depicted in FIG. 6A, the support shaft 66 includes a first supported surface 66a serving as a flat surface facing, in the second orthogonal direction Y2, a first support surface 73a of the first portion 73 that faces the second portion 75. The support shaft 66 includes a second supported surface 66b serving as another flat surface facing, in the second orthogonal direction Y2, a second support surface 75a of the second portion 75 that faces the first portion 73. The first support surface 73a and the second support surface 75a function, at the time of the secondary collision, as guide surfaces on which the support shaft 66 is guided downward in the column axial direction X.

The support shaft 66 includes recessed portions 66c each formed in one corner portion of a pair of corner portions located at diagonal positions. The recessed portions 66c are, for example, chamfered or depressed portions. The recessed portions 66c of each support shaft 66 function as tilt permitting portions that permit the support shaft 66 to tilt in the corresponding support hole 67. Thus, the second tooth defining member 50 supported by the support shafts 66 is rotatable around the central axis C2 (see FIG. 6B).

The guide mechanism 80 includes a guide shaft 81 and a guide hole 82. The guide shaft 81 is supported at opposite ends thereof by support holes 38 in the clamped portions 19 of the lower jacket 8. The guide hole 82 is formed in the second tooth defining member 50 so as to extend in the second orthogonal direction Y2. The guide shaft 81 functions as a to-be-fractured member that is sheared and fractured, at the time of the secondary collision, by a load imposed via a meshing engagement area between the first teeth 41 and the second teeth 51, thus permitting the first tooth defining member 40 and the second tooth defining member 50 to move integrally.

The interlocking mechanism 60 includes a bias member 90 and a release member 100. The bias member 90 rotationally biases the second tooth defining member 50 toward a meshing engagement side (the side where the second teeth 51 come into meshing engagement with the first teeth 41) around the central axis C2 of the support shafts 66. The release member 100 drives the second tooth defining member 50 toward the meshing engagement released side against the biasing of the bias member 90. The bias member 90 is a torsion spring including a first end 91, a second end 92, and a coil portion 93. The first end 91 is locked in a locking hole 39 in one of the clamped portions 19 that serves as a locking portion. The second end 92 presses and engages with the tooth defining portion 53 on the opposite side of the second tooth defining member 50 from the second teeth 51. The coil portion 93 is wound around the clamping shaft 21 between the first end 91 and the second end 92.

The release member 100 includes an annular main body 102 and a release protrusion 103. The main body 102 has a fitting hole 101 (spline hole) in which the clamping shaft 21 is spline-fitted so as to be rotatable together with the main body 102. The release protrusion 103 is a release portion protruding from an outer periphery of the main body 102. In conjunction with rotation of the clamping shaft 21 in an unlocking direction, the release protrusion 103 comes into engagement with an engaging protrusion 54 provided on the tooth defining portion 53 of the second tooth defining member 50 and serving as an engaging portion. Consequently, the release protrusion 103 rotates the second tooth defining member 50 toward the meshing engagement released side against the biasing of the bias member 90.

When the operation lever 20 is rotated in a locking direction (clockwise in FIG. 6A), the release member 100 is rotated clockwise along with the clamping shaft 21 from the state depicted in FIG. 6A to the state depicted in FIG. 6B. Consequently, the release protrusion 103 of the release member 100 pushes up the engaging protrusion 54 of the second tooth defining member 50. Thus, the second tooth defining member 50 is rotationally driven counterclockwise around the support (the central axis C2 of the support shafts 66) to separate the second teeth 51 from the first teeth 41 along the tooth trace direction D, releasing the meshing engagement (see FIG. 6B). This releases the telescopic locking based on the tooth locking.

Figure 9A:
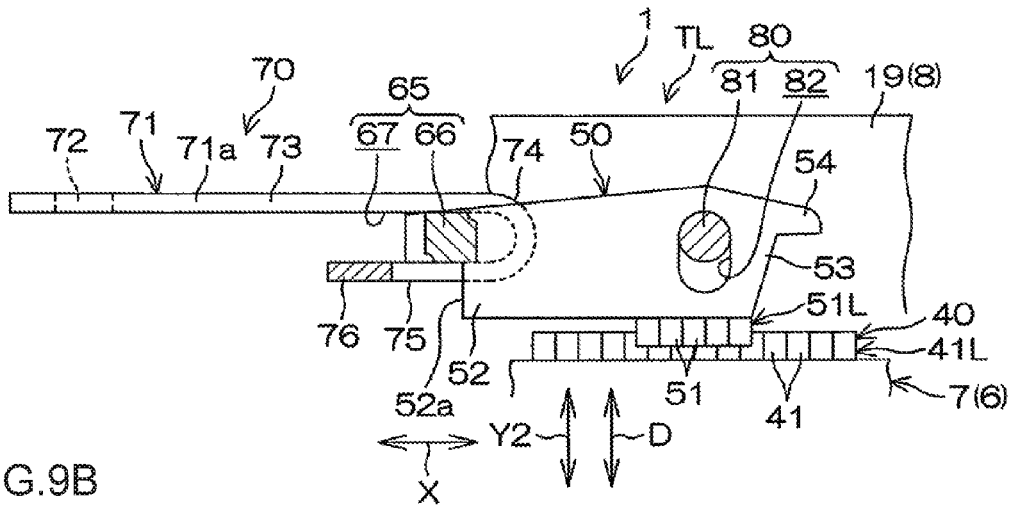
FIGS. 9A, 9B, and 9C are schematic side views of the second tooth defining member, the energy absorbing unit, and their peripheries.
Figure 9B:
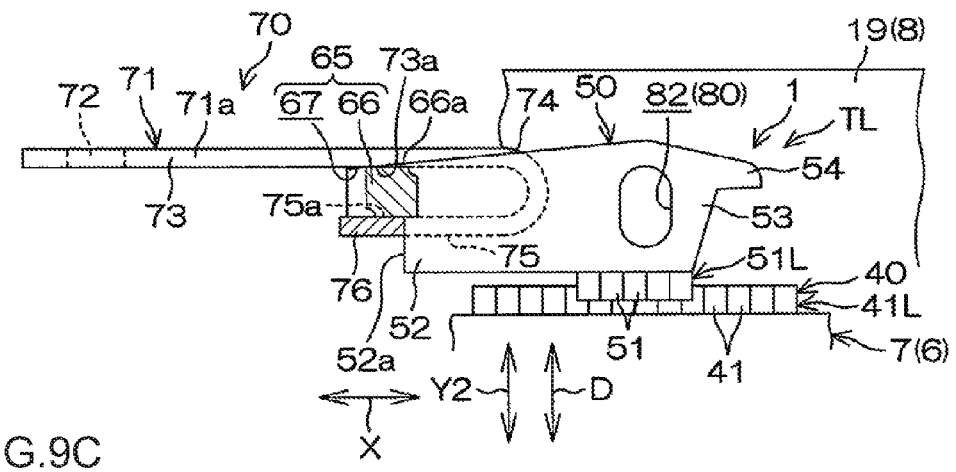
Figure 9C:
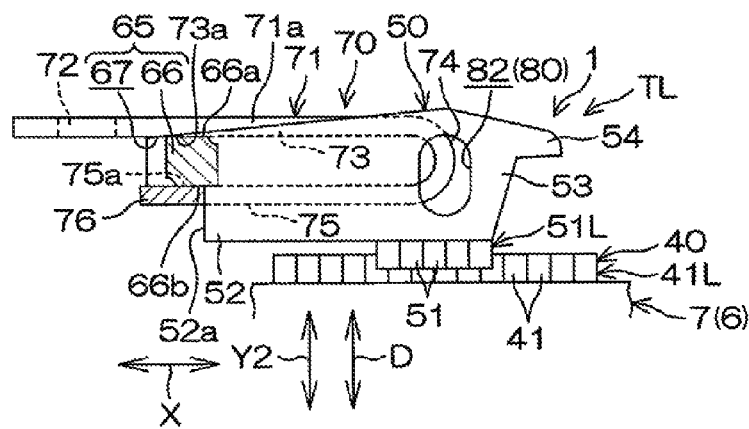

Now, operations of the steering system 1 at the time of the secondary collision will be described. The following description will be given with reference to FIGS. 9A, 9B, and 9C that are schematic side views of the second tooth defining member 50, the energy absorbing unit 70, and the peripheries thereof. FIG. 9A is a diagram depicting a state before the secondary collision. FIG. 9 B is a diagram depicting a state immediately after the supported portion 52 of the second tooth defining member 50 comes into abutting contact with the coupling portion 76 as a result of the secondary collision. FIG. 9C is a diagram depicting a state after movement of the fold-back portion 74 in the column axial direction X as a result of the secondary collision.

As seen in FIG. 9A depicting the state before the secondary collision, when the secondary collision occurs while the tooth locking mechanism TL is in the meshing engagement state (telescopic locking state), impact energy is transmitted to the tooth defining portion 53 through the first teeth 41, which move together with the upper jacket 7, and the second teeth 51. The impact energy is transmitted to the guide shaft 81 inserted through the guide hole 82 formed in the second tooth defining member 50. Consequently, the guide shaft 81 is fractured by shearing.

The fracture of the guide shaft 81 causes the second tooth defining member 50 to be detached from the clamped portions 19 of the lower jacket 8 with the second teeth 51 kept in meshing engagement with the first teeth 41 of the first tooth defining member 40. The second tooth defining member 50 detached from the clamped portions 19 moves in the column axial direction X along with the upper jacket 7 and eventually comes into abutting contact with the coupling portion 76 of the energy absorbing unit 70 as depicted in FIG. 9B. Specifically, the facing surface 52*a* of the supported portion 52 of the second tooth defining member 50 comes into abutting contact with the upper end of the coupling portion 76 in the column axial direction X. In FIG. 9B and FIG. 9C, illustration of the guide shaft 81 fractured as a result of the secondary collision is omitted.

The second tooth defining member 50 moves downward in the column axial direction X while pushing the coupling portion 76 to deform the energy absorbing portions 71, such that the energy absorbing unit 70 changes from a state depicted in FIG. 9B to a state depicted in FIG. 9C. Consequently, an energy absorbing load is generated to absorb impact energy generated at the time of the secondary collision. Specifically, the fold-back portions 74 are moved downward in the column axial direction X to deform the energy absorbing portions 71 such that the first portions 73 become shorter and the second portions 75 become longer. Thus, the energy absorbing portions 71 absorb the impact energy. At this time, the energy absorbing portions 71 guide downward movement of the second tooth defining member 50 in the column axial direction X between the facing edges 71*a* of the energy absorbing portions 71. At the same time, the support shafts 66 guide parallel movement of the second portions 75 with respect to the first portions 73. The first portions 73 guide downward movement of the support shafts 66 in the column axial direction X.

In the present embodiment, at the time of the secondary collision, the second tooth defining member 50 moves the fold-back portions 74 while movement of the second tooth defining member 50 is guided between the facing edges 71*a* of the energy absorbing portions 71, located on opposite sides of the second tooth defining member 50. Therefore, the energy absorbing portions 71 on the opposite sides of the second tooth defining member 50 can be evenly deformed, with spaces around the energy absorbing unit 70 effectively utilized. The second tooth defining member 50 is guided between the facing edges 71*a* of the energy absorbing portions 71 on the opposite sides of the second tooth defining member 50 to regulate movement of the second tooth defining member 50 in the first orthogonal direction Y1. Thus, at the time of the secondary collision, the orientation of the second tooth defining member 50 is stabilized.

The energy absorbing unit 70 is provided separately from the first tooth defining member 40. Thus, any material and any shape can be applied to the energy absorbing unit 70 regardless of the material and shape of the first tooth defining member 40. Therefore, compared to an energy absorbing unit provided with tooth portions for tooth locking, the energy absorbing unit 70 increases the degree of freedom of setting of the energy absorbing load. At the time of the secondary collision, the first portion 73 and the second portion 75 of each energy absorbing portion 71 are guided by the corresponding support shaft 66 to move parallel to each other, allowing the corresponding fold-back portion 74 to be smoothly moved.

The first portion 73 and the second portion 75 of each energy absorbing portion 71 guide downward movement of the corresponding support shaft 66 in the column axial direction X. Consequently, at the time of the secondary collision, movement of the support shafts 66 in the second orthogonal direction Y2 is regulated. Thus, at the time of the secondary collision, the orientation of the second tooth defining member 50 is stabilized. At the time of the secondary collision, the energy absorbing portions 71 as a whole are deformed so as to shorten in the column axial direction X. That is, the energy absorbing portions 71 and the second tooth defining member 50 can move within a layout space for the energy absorbing unit 70 and the tooth locking mechanism TL before the secondary collision to exert an energy absorbing load. Therefore, spaces can be effectively utilized.

Figure 10:
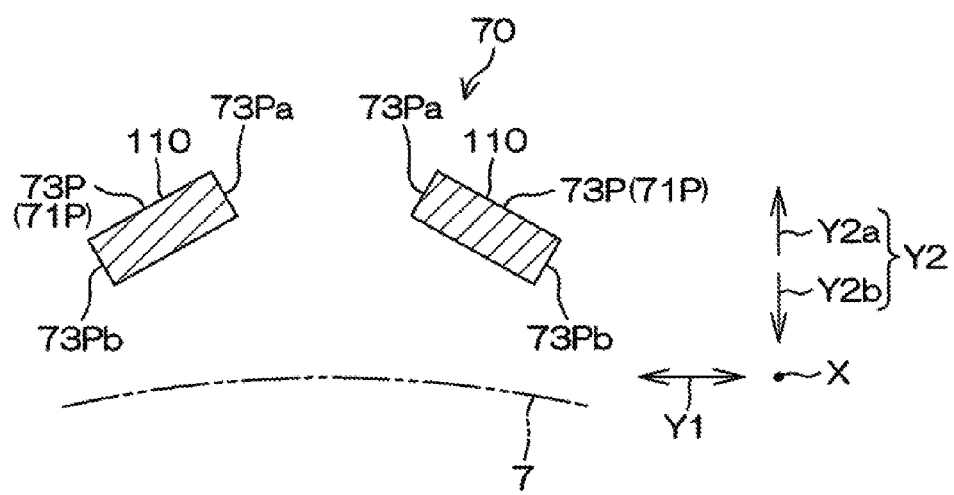
FIG. 10 is a sectional view of first portions of energy absorbing portions according to a first modification of the present embodiment, which view is taken along a plane orthogonal to the column axial direction.

A first modification and a second modification of the present embodiment will be described. As depicted in FIG. 10, in a sectional view of first portions 73P of a pair of energy absorbing portions 71P according to the first modification, which is taken along a plane orthogonal to the column axial direction X, the first portions 73P are arranged like the separated sides of an inverted V. Each of the first portions 73P in the first modification includes an inclined portion 110 inclined with respect to the first orthogonal direction Y1 to allow bending rigidity to be enhanced. Specifically, edges 73Pa of the first portions 73 located closer to the center of the energy absorbing unit 70 are arranged on a side Y2*a* in the second orthogonal direction Y2 (on a side away from the upper jacket 7) with respect to edges 73Pb of the first portions 73 located farther from the center of the energy absorbing unit 70.

Members in the first modification in FIG. 10 that are similar to the corresponding members described in the present embodiment are denoted by the same reference numerals and will not be described below (this also applies to the second modification in FIG. 11, a third modification in FIGS. 12 to 17, and a fourth modification in FIGS. 18 to 21 described below). Although not depicted in the drawings, the first portions 73P may be arranged like the separated sides of V in a sectional view. Specifically, the edges 73Pa of the first portions 73 located closer to the center of the energy absorbing unit 70 may be arranged on a side Y2*b* in the second orthogonal direction Y2 (on a side closer to the upper jacket 7) with respect to the edges 73Pb of the first portions 73 located farther from the center of the energy absorbing unit 70.

In the first modification, the inclined portions 110, which allow the bending rigidity to be enhanced, make the first portions 73 difficult to deflect toward the corresponding second portions 75. Thus, behavior of the energy absorbing portions 71P can be stabilized at the time of the secondary collision. In the first modification, at the time of the secondary collision, each support shaft 66, which moves through the corresponding support hole 67 in the column axial direction X, can be restrained from being caught on the corresponding first portion 73P deflected toward the corresponding second portion 75. This allows energy absorption to be stabilized at the time of the secondary collision.

Figure 11:
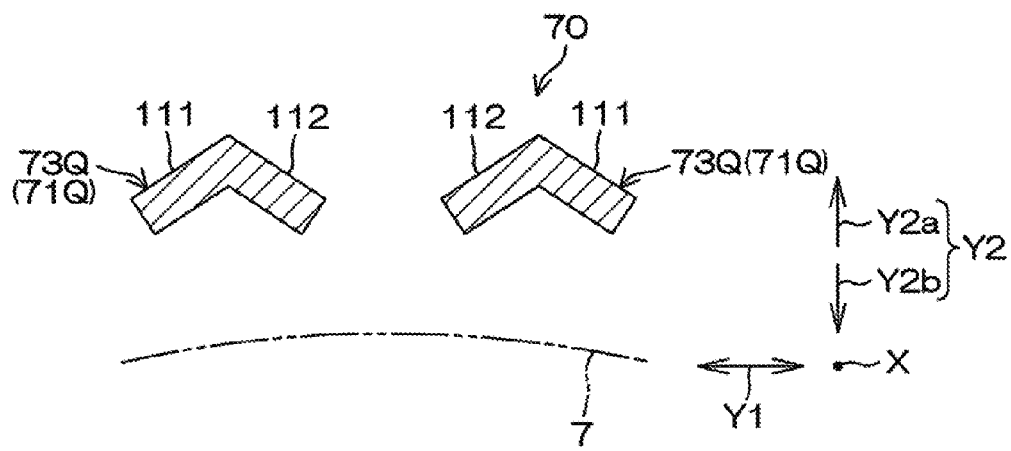
FIG. 11 is a sectional view of first portions of energy absorbing portions according to a second modification of the present embodiment, which view is taken along a plane orthogonal to the column axial direction.

FIG. 11 is a sectional view of first portions 73Q of energy absorbing portions 71Q according to the second modification, which view is taken along a plane orthogonal to the column axial direction X. As depicted in FIG. 11, each of the first portions 73Q has an inverted V-shape section, including a pair of inclined portions 111 and 112 inclined in opposite directions. The first portions 73Q protrude toward the side Y2a in the second orthogonal direction Y2. Although not depicted in the drawings, each of the first portions 73Q may be configured to protrude toward the side Y2b in the second orthogonal direction Y2. Each of the inclined portions 111 and 112 may be curved.

Figure 12:
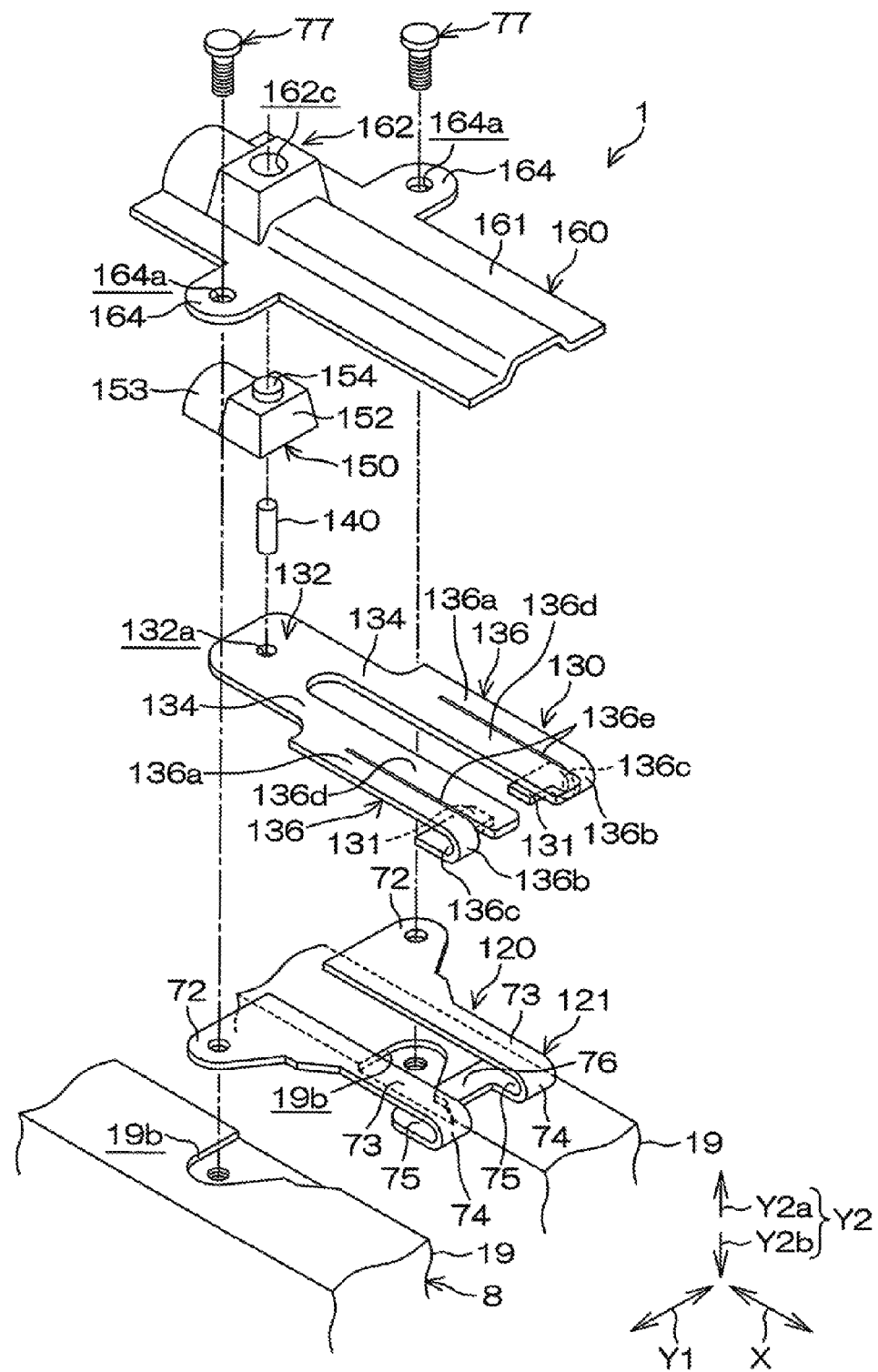
FIG. 12 is an exploded perspective view of an important part of a steering system according to a third modification of the present embodiment.

In the second modification, the inclined portions 111 and 112, which allow the bending rigidity to be enhanced, make the first portions 73 more difficult to deflect toward the corresponding second portions 75. Thus, behavior of the energy absorbing portions 71 can further be stabilized at the time of the secondary collision. The third modification of the present embodiment will be described below. FIG. 12 is an exploded perspective view of an important part of the steering system 1 according to the third modification of the present embodiment.

As seen in FIG. 12, the steering system 1 in the third modification includes a first energy absorbing unit 120 with first energy absorbing portions 121 instead of the energy absorbing unit 70 with the energy absorbing portions 71 in the steering system 1 in the present embodiment depicted in FIG. 5. The steering system 1 in the third modification includes a second energy absorbing unit 130, an engaging protrusion 140, a driving mechanism 150, and a cover member 160.

The first energy absorbing unit 120 has generally the same structure as that of the energy absorbing unit 70 (see FIG. 5) but is different from the energy absorbing unit 70 in that the width of the restraining portions 72 in the first orthogonal direction Y1 decreases in stages toward the first portions 73. The second energy absorbing unit 130 includes a pair of moving portions 131, an engaged portion 132, and a pair of second energy absorbing portions 136. The second energy absorbing portions 136 are installed between the pair of moving portions 131 and a pair of extension portions 134. The extension portions 134 extend upward from the engaged portion 132 in the column axial direction X so as to be spaced from each other in the first orthogonal direction Y1. One second energy absorbing portion 136 is installed between one of the moving portions 131 and the corresponding extension portion 134. One second energy absorbing portion 136 is installed between the other moving portion 131 and the corresponding extension portion 134.

Each of the second energy absorbing portions 136 includes a first portion 136a, a curved fold-back portion 136b, and a second portion 136c. The first portion 136a extends upward from the extension portion 134 in the column axial direction X. The second portion 136c is formed by folding back the second energy absorbing portion 136 at the fold-back portion 136b. Each of the second energy absorbing portions 136 includes a third portion 136d located inside and adjacently to the first portion 136a in the first orthogonal direction Y1 and extending upward from the extension portion 134 in the column axial direction X. Each of the second energy absorbing portions 136 has a groove 136e formed at a boundary between the first portion 136a and the third portion 136d so as to thin the second energy absorbing portion 136 in the second orthogonal direction Y2. The groove 136e extends in the column axial direction X.

Figure 13:
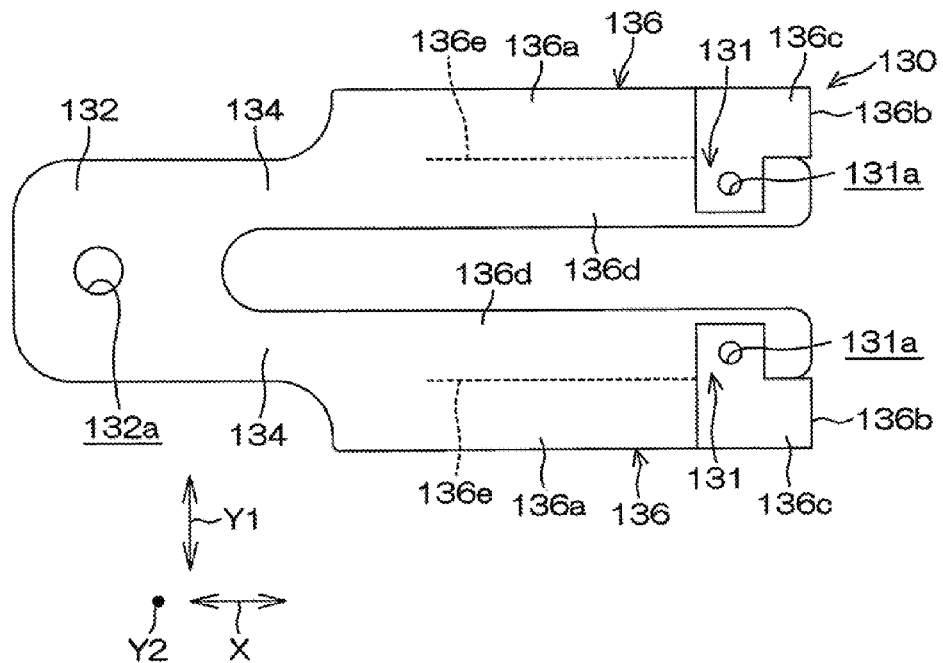
FIG. 13 is a bottom view of a second energy absorbing unit according to the third modification.

As seen in FIG. 13 that is a bottom view of the second energy absorbing unit 130, the moving portions 131 are separated from each other in the first orthogonal direction Y1. Each of the moving portions 131 extends inward from the second portion 136c of the corresponding second energy absorbing portion 136 in the first orthogonal direction Y1. In each of the moving portions 131, a pin hole 131a is formed which penetrates the moving portion 131 in the second orthogonal direction Y2. In the engaged portion 132, an engaged hole 132a is formed which penetrates the engaged portion 132 in the second orthogonal direction Y2.

As seen in FIG. 12, the engaging protrusion 140 has a columnar shape extending in the second orthogonal direction Y2. The engaging protrusion 140 is inserted through the engaged hole 132a in the engaged portion 132 so as to be engaged with the engaged portion 132. The driving mechanism 150 includes a block-shaped main body portion 152, an extension portion 153, and a disc-shaped protruding portion 154. The extension portion 153 extends downward from the main body portion 152 in the column axial direction X. The protruding portion 154 protrudes from the main body portion 152 in the second orthogonal direction Y2.

Figure 14:
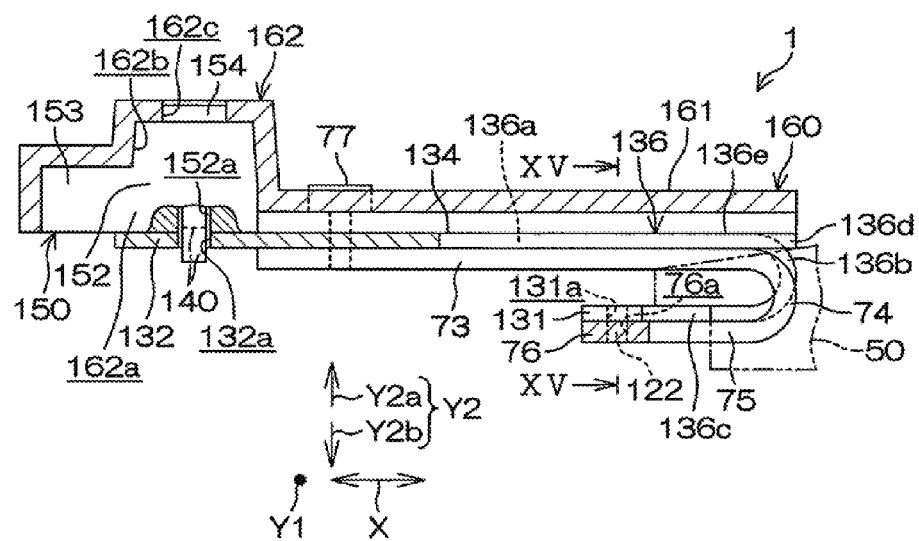
FIG. 14 is a schematic side view of an important part of the steering system in the third modification.

FIG. 14 is a schematic side view of an important part of the steering system 1 in the third modification. In FIG. 14, for convenience of description, the second tooth defining member 50 is depicted by a long dashed double-short dashed line (this also applies to FIG. 16 and FIG. 17 described below). In FIG. 14, the driving mechanism 150 is shown in a partial sectional view. As seen in FIG. 14, the main body portion 152 has a housing hole 152a in which the engaging protrusion 140 is housed and supported.

The driving mechanism 150 is configured to drive the engaging protrusion 140 in the second orthogonal direction Y2. The driving mechanism 150 is, for example, a pyroactuator that is actuated using gunpowder. The driving mechanism 150 is electrically connected to a control portion not depicted in the drawings. The control portion is, for example, an electronic control unit (ECU). The control portion determines whether or not to actuate the driving mechanism 150 based on information such as whether or not a seatbelt is worn, a driver's weight, a vehicle speed, and/or an acceleration of the vehicle at the time of a collision. Normally, the engaging protrusion 140 is fitted in the engaged hole 132a to engage with the engaged portion 132.

Upon being actuated by the control portion, the driving mechanism 150 retracts the engaging protrusion 140 toward an engagement released position where the engagement with the engaged portion 132 is released (see a long dashed short dashed line in FIG. 14). As seen in FIG. 12, the cover member 160 integrally includes a regulating portion 161, a housing portion 162, and a pair of restraining portions 164. The regulating portion 161 regulates rise of the second energy absorbing portions 136. The housing portion 162 houses the driving mechanism 150.

The regulating portion 161 is elongate in the column axial direction X. The regulating portion 161 protrudes, generally at the center thereof in the first orthogonal direction Y1, toward a side (side Y2a) opposite to the second energy absorbing unit 130 in the second orthogonal direction Y2. The restraining portions 164 are arranged at a lower end of the regulating portion 161 in the column axial direction X. The restraining portions 164 protrude from the regulating portion 161 in opposite outward directions in the first orthogonal direction Y1. In each of the restraining portions 164, a through-hole 164a is formed which penetrates the restraining portion 164 in the second orthogonal direction Y2.

The cover member 160, the second energy absorbing unit 130, and the first energy absorbing unit 120 are laid on top of one another in the second orthogonal direction Y2. One bolt is inserted through each of the through-holes 164a in the restraining portions 164 of the cover member 160. The restraining portions 164 are clamped along with the restraining portions 72 of the first energy absorbing unit 120 and fixed to the recessed portions 19b of the clamped portions 19. The restraining portions 164 need not necessarily be clamped with the bolts 77 but may be fixed to the lower jacket 8 by welding or using rivets or pins.

As seen in FIG. 14, the housing portion 162 is located below and adjacently to the regulating portion 161 in the column axial direction X. The housing portion 162 has an opening 162a in the second orthogonal direction Y2. The housing portion 162 has an internal space 162b to house the driving mechanism 150. A through-hole 162c is formed in the housing portion 162 so as to penetrate a bottom portion of the housing portion 162 located on the opposite side from the opening 162a (located on the side Y2a) in the second orthogonal direction Y2. The through-hole 162c is in communication with the internal space 162b. The driving mechanism 150 and the engaging protrusion 140 supported by the driving mechanism 150 are supported by the lower jacket 8 via the cover member 160 (see FIG. 14). In this state, the protruding portion 154 of the driving mechanism 150 is inserted through the through-hole 162c in the housing portion 162.

Figure 15:
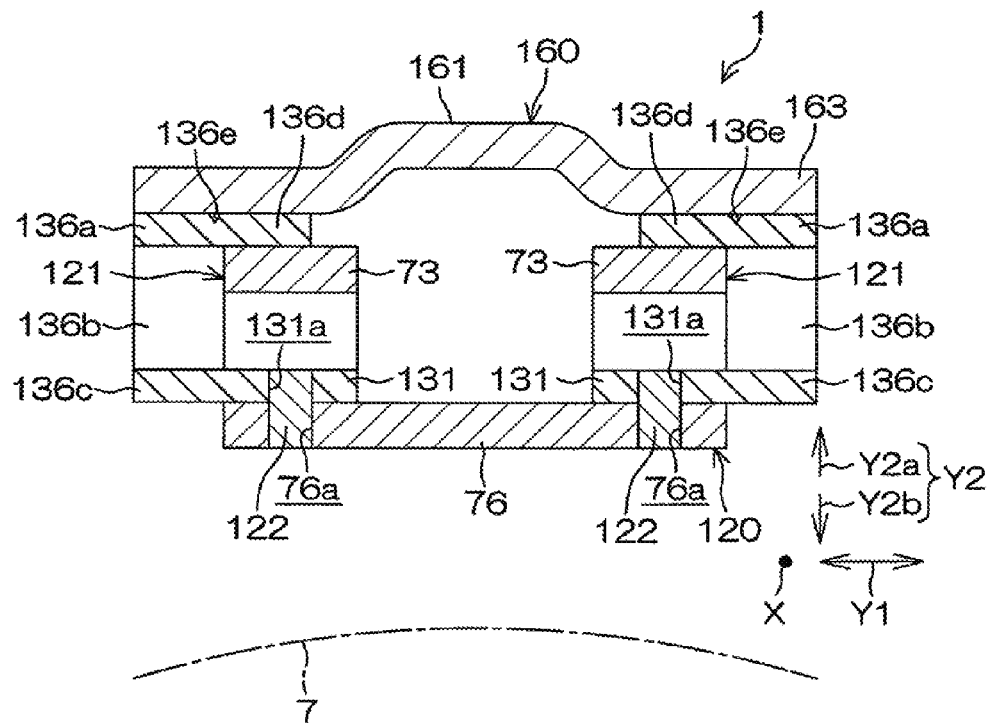
FIG. 15 is a sectional view taken along line XV-XV in FIG. 14.

FIG. 15 is a sectional view taken along line XV-XV in FIG. 14. In FIG. 15, the upper jacket 7 is depicted by a long dashed short dashed line. As seen in FIG. 15, a pair of pin holes 76a is formed in the coupling portion 76 of the first energy absorbing unit 120. The moving portions 131 of the second energy absorbing unit 130 are located on the opposite side of the coupling portion 76 of the first energy absorbing unit 120 from the upper jacket 7 (on the side Y2a) in the second orthogonal direction Y2 and are in contact with the coupling portion 76. A pair of pins 122 extending in the second orthogonal direction Y2 is press-fitted in the respective pin holes 131a of the moving portions 131 and the respective pin holes 76a of the coupling portion 76. Thus, the moving portions 131 are fixed to the coupling portion 76 and are movable together with the coupling portion 76. Unlike in the third modification, the moving portions 131 may be fixed to the coupling portion 76 by welding or the like or fixed to the second portions 75.

The first portions 73 of the first energy absorbing unit 120 are located on the side Y2b with respect to the third portions 136d of the second energy absorbing unit 130 and in contact with the third portions 136d. The first portions 136a and the third portions 136d of the second energy absorbing unit 130 are located on the side Y2b with respect to the regulating portion 161 of the cover member 160 and in contact with the regulating portion 161. The grooves 136e are positioned outside the respective first portions 73 of the first energy absorbing portions 121 in the first orthogonal direction Y1.

Figure 16:
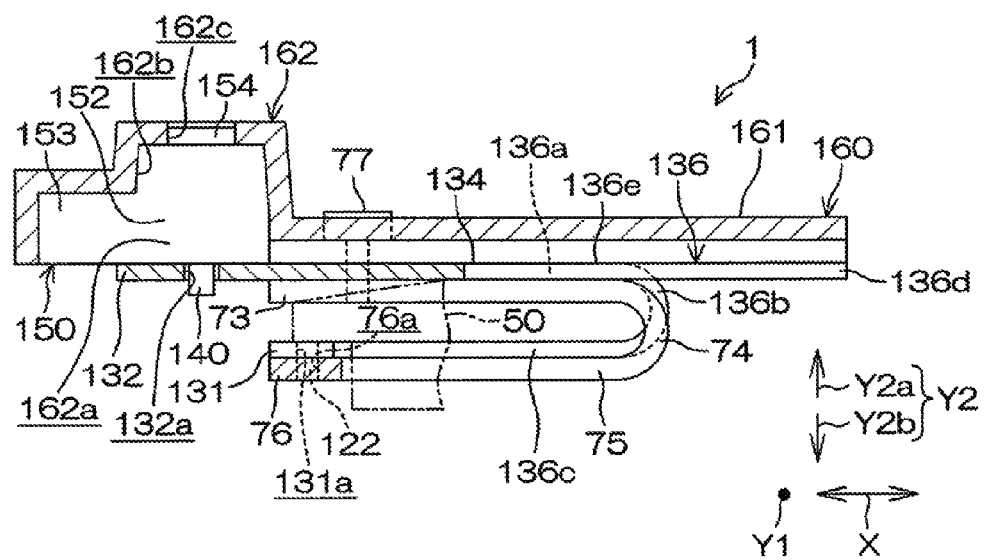
FIG. 16 is a schematic side view of an important part of the steering system in the third modification after occurrence of the secondary collision with an engaging protrusion in an engagement position.

Operations of the steering system 1 in the third modification at the time of the secondary collision will be described below. FIG. 16 is a schematic side view of an important part of the steering system 1 in the third modification after occurrence of the secondary collision with the engaging protrusion 140 in the engagement position. At the time of the secondary collision, the coupling portion 76 moves together with the second tooth defining member 50 and downward in the column axial direction X. Thus, as is the case with the present embodiment, the first energy absorbing portions 121 are deformed to absorb a portion of the impact energy generated at the time of the secondary collision. However, in the third modification, at the time of the secondary collision, the moving portions 131 fixed to the coupling portion 76 also move downward in the column axial direction X along with the second tooth defining member 50. With the engaging protrusion 140 located in the engagement position, movement, in the column axial direction X, of the engaged portion 132 with which the engaging protrusion 140 engages is regulated. Thus, the moving portions 131 move downward in the column axial direction X with respect to the engaged portion 132 to deform the second energy absorbing portions 136 along with the first energy absorbing portions 121, absorbing the impact energy at the time of the secondary collision.

Specifically, the fold-back portions 136b are moved downward in the column axial direction X to bend the second energy absorbing portions 136 such that the first portions 136a become shorter and the second portions 136c become longer. Thus, the second energy absorbing portions 136 absorb the impact energy. Simultaneously with the shortening of the first portions 136a, the second energy absorbing portions 136 are torn away along the respective grooves 136e each between the third portion 136d and the first portion 136a, further absorbing the impact energy generated at the time of the secondary collision.

As described above, when the secondary collision occurs with the engaging protrusion 140 located in the engagement position, the impact energy generated at the time of the secondary collision is absorbed by deformation of the first energy absorbing portions 121 of the first energy absorbing unit 120 and deformation of the second energy absorbing portions 136 of the second energy absorbing unit 130. Thus, compared to deformation only of the first energy absorbing portions 121, deformation of the first and second energy absorbing portions 121 and 136 increases the energy absorbing load, enabling a high-load energy absorption.

Figure 17:
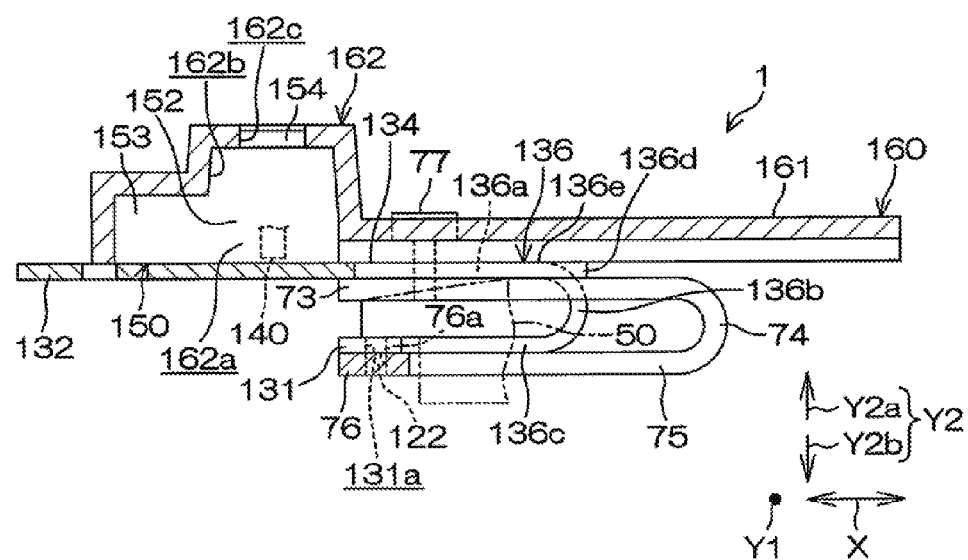
FIG. 17 is a schematic side view of an important part of the steering system in the third modification after occurrence of the secondary collision with the engaging protrusion in an engagement released position.

FIG. 17 is a schematic side view of an important part of the steering system 1 in the third modification after occurrence of the secondary collision with the engaging protrusion located in the engagement released position. As seen in FIG. 17, when the secondary collision occurs with the engaging protrusion 140 located in the engagement released position, the engaged portion 132 moves along with the moving portions 131 in the column axial direction X. Thus, the second energy absorbing portions 136 are not deformed and do not absorb the impact energy generated at the time of the secondary collision.

When the secondary collision occurs with the engaging protrusion 140 located in the engagement released position, the impact energy generated at the time of the secondary collision is absorbed only by deformation of the first energy absorbing portions 121. Thus, compared to deformation of the first and second energy absorbing portions 121 and 136, deformation only of the first energy absorbing portions 121 reduces the energy absorbing load, enabling a low-load energy absorption. As described above, the driving mechanism 150 changes the position of the engaging protrusion 140 to allow the impact energy generated at the time of the secondary collision to be absorbed only by the first energy absorbing unit 120 or both by the first energy absorbing unit 120 and by the second energy absorbing unit 130. Therefore, the energy absorbing load imposed at the time of the secondary collision can be adjusted.

For example, if the driver with a relatively large body or fails to correctly wear the seatbelt, the engaging protrusion 140 is advanced to the engagement position so that the energy absorbing load can be increased. If the driver with a relatively small body or correctly wears the seatbelt, the engaging protrusion 140 is retracted to the engagement released position so that the energy absorbing load can be reduced. Consequently, after the steering system 1 is assembled, the energy absorbing load is changed as needed to allow occupants to be optimally protected at the time of the secondary collision.

Figure 18:
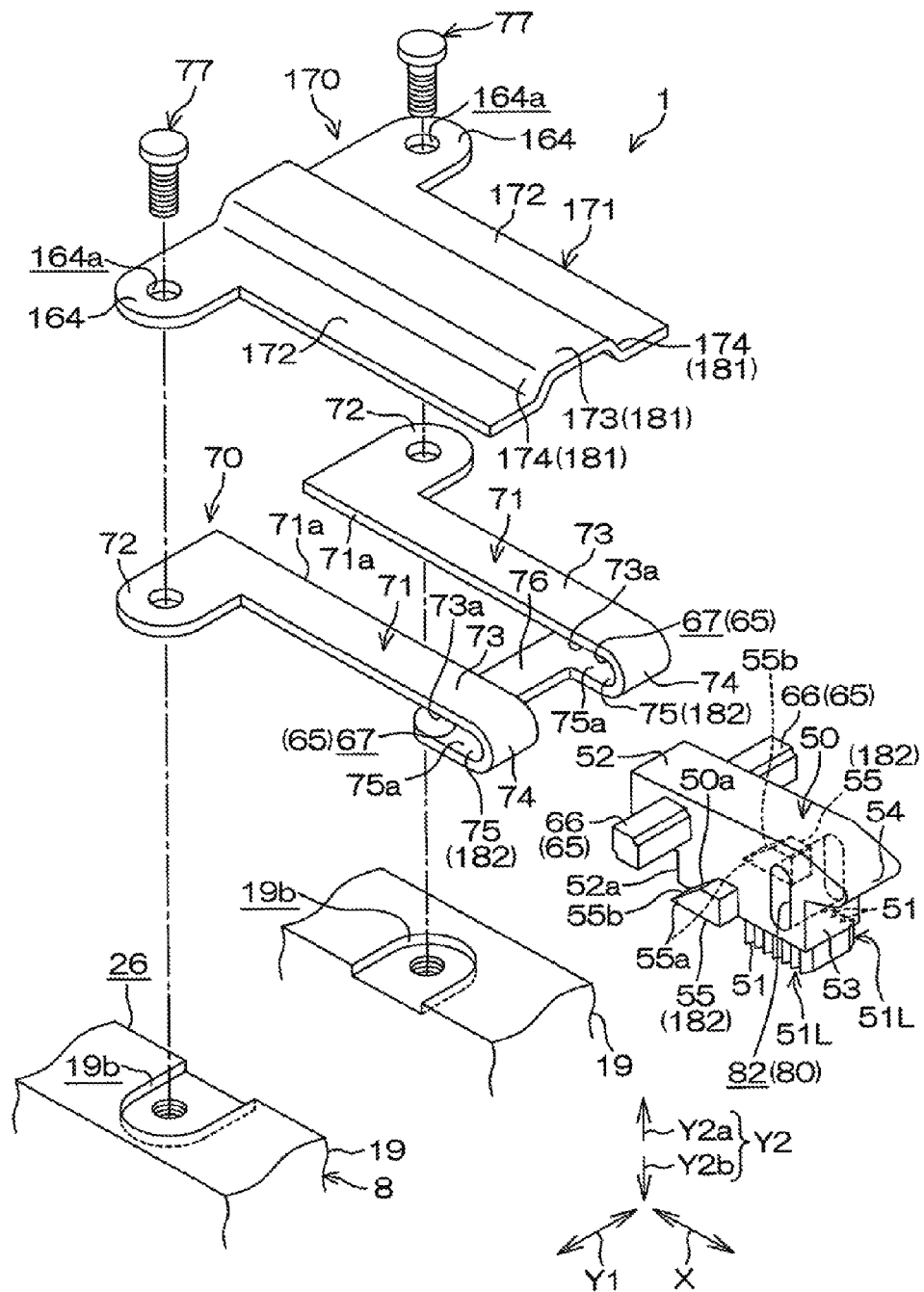
FIG. 18 is an exploded perspective view of an important part of a steering system according to a fourth modification of the present embodiment.

The second energy absorbing unit 130 overlaps the first energy absorbing unit 120, enabling an increase in the degree of freedom of layout and a reduction in the size of the system. The third modification further exerts effects similar to the effects of the present embodiment. The fourth modification of the present embodiment will be described below. FIG. 18 is an exploded perspective view of an important part of the steering system 1 according to the fourth modification.

As seen in FIG. 18, unlike the steering system 1 in the present embodiment, the steering system 1 in the fourth modification includes a cover member 170. Unlike the second tooth defining member 50 in the present embodiment (see FIG. 4), the second tooth defining member 50 in the fourth modification includes a pair of facing portions 55. The cover member 170 integrally includes a regulating portion 171 and the pair of restraining portions 164. The regulating portion 171 regulates rise of the energy absorbing portions 71 of the energy absorbing unit 70. The restraining portions 164 are arranged at a lower end of the regulating portion 171 in the column axial direction X. The restraining portions 164 protrude from the regulating portion 171 in opposite outward directions in the first orthogonal direction Y1. The restraining portions 164 are configured similarly to the restraining portions 164 of the cover member 160 in the third modification (see FIG. 12) and will thus not be described in detail.

The regulating portion 171 is shaped like a plate that is elongate in the column axial direction X. The regulating portion 171 protrudes, generally at the center thereof in the first orthogonal direction Y1, toward the side Y2a in the second orthogonal direction Y2. Specifically, the regulating portion 171 integrally includes a pair of first portions 172, a second portion 173, and a pair of inclined portions 174. The first portions 172 are spaced from each other in the first orthogonal direction Y1. The first portions 172 are located on the side Y2a with respect to the respective first portions 73 of the energy absorbing portions 71 of the energy absorbing unit 70 and in contact with the respective first portions 73 (see also FIG. 21 described below).

Figure 19:
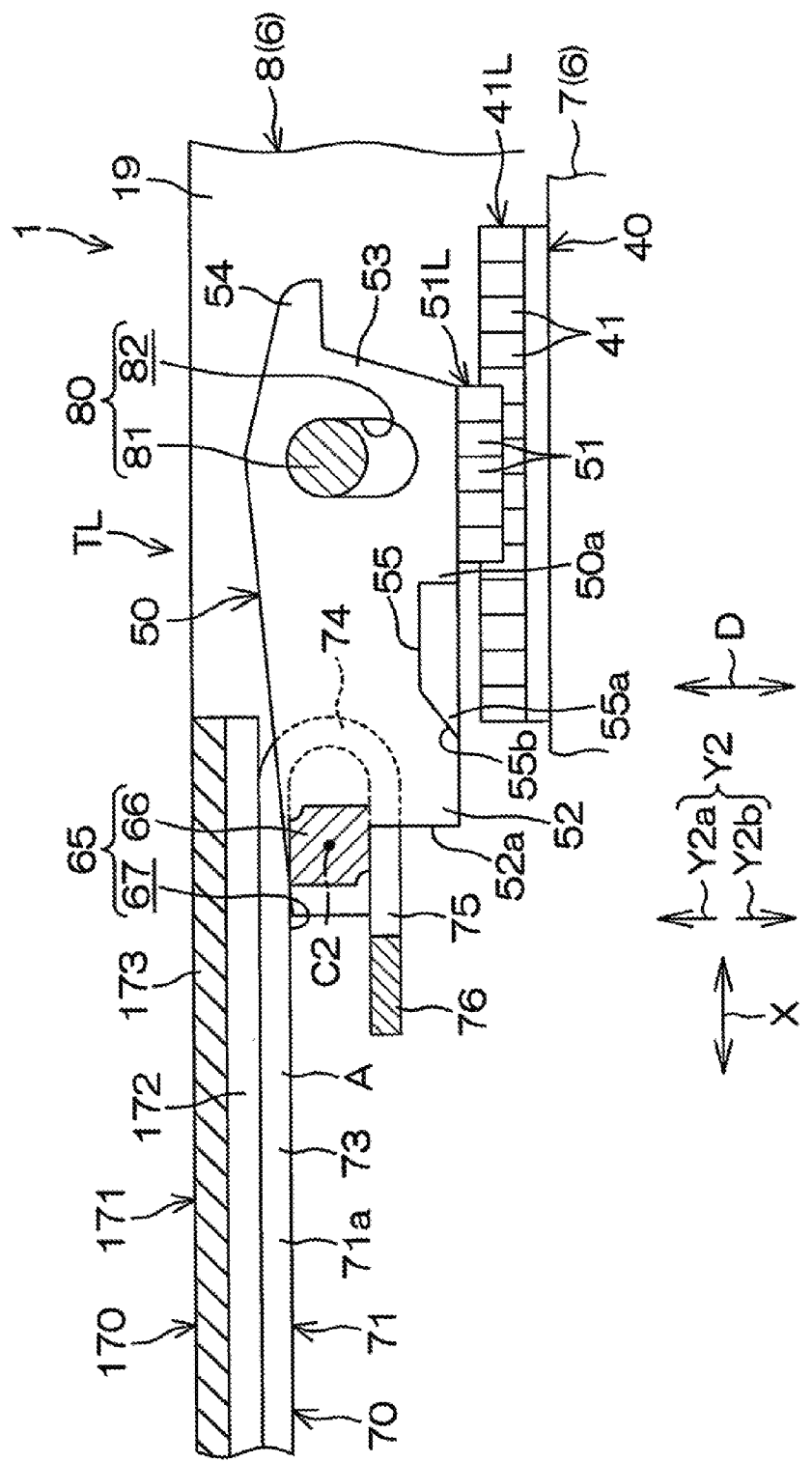
FIG. 19 is a schematic side view of an important part of the steering system in the fourth modification.

The second portion 173 is arranged inside the first portions 172 in the first orthogonal direction Y1 and on the side Y2a in the second orthogonal direction Y2 with respect to the first portions 172. FIG. 19 is a schematic side view of an important part of the steering system 1 in the fourth modification. As seen in FIG. 19, the second portion 173 is located on the side Y2a with respect to the first portions 172 so as to cover a space A sandwiched between the facing edges 71a in the first orthogonal direction Y1.

As seen in FIG. 18, each of the inclined portions 174 is provided between the corresponding first portion 172 and the second portion 173. The inclined portions 174 are inclined with respect to the first portions 172 so as to extend from the first portions 172 toward the side Y2a while becoming closer to each other in the first orthogonal direction Y1. Unlike in the fourth modification, the inclined portions 174 may be orthogonal portions that are orthogonal to the first portions 172 as viewed in the column axial direction X.

The facing portions 55 of the second tooth defining member 50 protrude, in respective opposite outward directions in the first orthogonal direction Y1, from a portion 50a arranged above the supported portion 52 in the column axial direction X. The facing portions 55 each have a block shape. As seen in FIG. 19, the facing portions 55 are positioned above the energy absorbing unit 70 in the column axial direction X. Thus, when the second tooth defining member 50 rotates around the central axis C2 of the support shafts 66, the facing portions 55 do not come into contact with the energy absorbing unit 70. Therefore, the second tooth defining member 50 rotates around the central axis C2, without being obstructed by the facing portions 55, so that the second teeth 51 come into meshing engagement with the first teeth 41 of the first tooth defining member 40.

A lower end 55a of each of the facing portions 55 in the column axial direction X is tapered. The lower end 55a has an inclined surface 55b inclined toward the side Y2b with respect to the facing portions 55 as the inclined surface 55b extends downward in the column axial direction X (see also FIG. 18). When the secondary collision occurs with the tooth locking mechanism TL in the meshing engagement state, the guide shaft 81 is fractured and the second tooth defining member 50 is detached from the clamped portions 19 with the second teeth 51 kept in meshing engagement with the first teeth 41 of the first tooth defining member 40, as is the case with the present embodiment.

Figure 20:
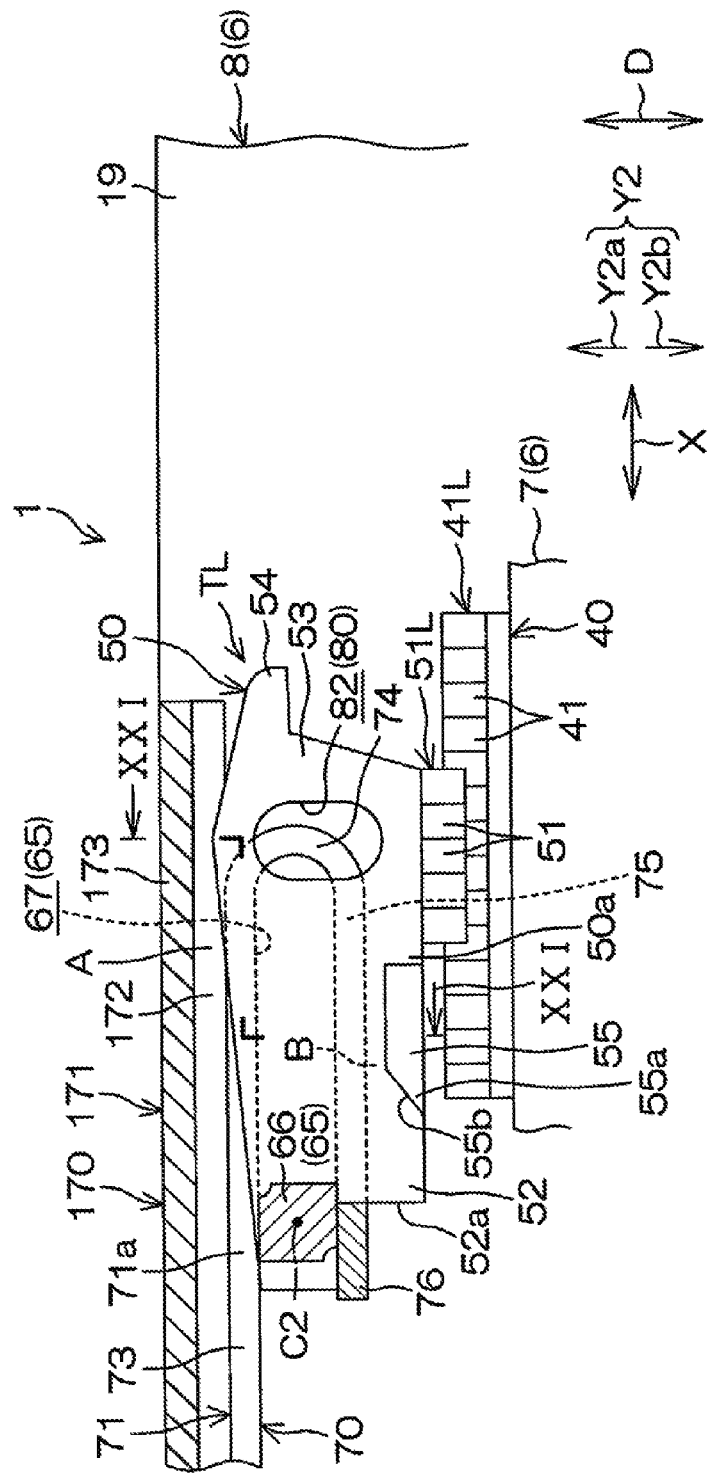
FIG. 20 is a diagram illustrating that a second tooth defining member in FIG. 19 is moving in the column axial direction as a result of the secondary collision.

The second tooth defining member 50 detached from the clamped portions 19 moves downward in the column axial direction X along with the upper jacket 7. When the facing surface 52a of the supported portion 52 of the second tooth defining member 50 comes into abutting contact with the upper end of the coupling portion 76 in the column axial direction X, the second tooth defining member 50 moves downward in the column axial direction X while pushing the coupling portion 76 to deform the energy absorbing portions 71. FIG. 20 illustrates that the second tooth defining member 50 in FIG. 19 is moving in the column axial direction X as a result of the secondary collision. In FIG. 20, illustration of the guide shaft 81 fractured as a result of the secondary collision is omitted. FIG. 21 is a sectional view taken along line XXI-XXI in FIG. 20. In FIG. 21, illustration of the clamped portions 19 and the bolts 77 is omitted.

As seen in FIG. 20, upon moving downward in the column axial direction X at the time of the secondary collision, the second tooth defining member 50 enters the space A sandwiched between the facing edges 71a in the first orthogonal direction Y1. As described above, the second portion 173 of the cover member 170 is located on the side Y2a with respect to the space A so as to cover the space A (see FIG. 21). Thus, the second tooth defining member 50 comes into abutting contact with the second portion 173 of the cover member 170 so that possible rise of the second tooth defining member 50 can be inhibited. Therefore, the orientation of the second tooth defining member 50 can further be stabilized at the time of the secondary collision, inhibiting release of the meshing engagement between the first teeth 41 and the second teeth 51 at the time of the secondary collision.

At this time, the inclined portions 174 of the cover member 170 each face corresponding one of the opposite end surfaces of the second tooth defining member 50 in the first orthogonal direction Y1 (see FIG. 21). Thus, the orientation of the second tooth defining member 50 can further be stabilized. The second portion 173 of the cover member 170 and the inclined portions 174 thus form a first orientation holding mechanism 181 that holds the orientation of the second tooth defining member 50 at the time of the secondary collision.

When the second tooth defining member 50 moves downward in the column axial direction X at the time of the secondary collision, each of the facing portions 55 enters a gap B between the second portion 75 of the corresponding energy absorbing portion 71 and the upper jacket 7 or the first tooth defining member 40. Each facing portion 55 has the inclined surface 55b and can thus smoothly enter the gap B without being caught on the corresponding second portion 75 even when the gap B is narrow in the second orthogonal direction Y2.

As seen in FIG. 21, the facing portions 55 having entered the gap B are located on the side Y2b with respect to the second portions 75 of the energy absorbing portions 71 so as to face the second portions 75. Thus, the facing portions 55 come into abutting contact with the respective second portions 75 to allow inhibition of rise of the second tooth defining member 50. Therefore, the orientation of the second tooth defining member 50 can further be stabilized at the time of the secondary collision. This allows inhibition of release of the meshing engagement between the first teeth 41 and the second teeth 51 at the time of the secondary collision (see also FIG. 20). In other words, meshing engagement can be reliably kept between the first teeth 41 and the second teeth 51 at the time of the secondary collision. In this manner, the facing portions 55 and the second portions 75 form a second orientation holding mechanism 182 that holds the orientation of the second tooth defining member 50 at the time of the secondary collision.

At the time of the secondary collision, the orientation of the second tooth defining member 50 is stably held by the first orientation holding mechanism 181 and the second orientation holding mechanism 182 with the second teeth 51 and the first teeth 41 kept in meshing engagement with one another. Thus, the energy absorbing unit 70 can stably absorb the impact energy at the time of the secondary collision.

The fourth modification further exerts effects similar to the effects of the present embodiment.

The invention is not limited to the above-described embodiments, and various modifications may be made to the embodiments within the scope recited in the claims. For example, any modifications may be made to the second tooth defining member 50 as long as the second tooth defining member 50 can establish and release meshing engagement and can be detached at the time of the secondary collision. The guide hole 82 may be omitted from the second tooth defining member 50. In this case, in the second tooth defining member 50, a round hole (not depicted in the drawings) is formed through which the guide shaft 81 is inserted and supported. In this case, in the clamped portions 19, the support holes 38 are not formed but guide holes (not depicted in the drawings) are formed through which the guide shaft 81 is inserted and guided.

The positional relationship between the first portion 73 and the second portion 75 of each energy absorbing portion 71 may be reversed from that in the present embodiment. That is, in the present embodiment, the second portion 75 is arranged on the side Y2b in the second orthogonal direction Y2 with respect to the first portion 73. However, the second portion 75 may be arranged on the side Y2a in the second orthogonal direction Y2 with respect to the first portion 73. In the present embodiment, the energy absorbing unit 70 is provided with the pair of energy absorbing portions 71. However, the energy absorbing unit 70 may be provided with three or more energy absorbing portions 71.

The first portions 73 may be coupled together unless the coupling inhibits movement of the second tooth defining member 50 or makes deformation of the energy absorbing portions 71 unstable. The support shafts 66 need not necessarily be supported by the energy absorbing portions 71 but may be supported directly by the lower jacket 8. In this case, the hole defined by the first portion 73 and the second portion 75 of each energy absorbing portion 71 does not function as the support hole 67. In this case, slots (not depicted in the drawings) formed in the clamped portions 19 of the lower jacket 8 and extending in the column axial direction X allow the support shafts 66 to be supported and guided in the column axial direction X.

The steering system 1 is a so-called upper lever-type steering system, in which the clamping shaft 21 with the operation lever 20 fixed thereto is arranged above the upper jacket 7 in the tilt direction Z. However, the invention is applicable to a so-called lower lever-type steering system, in which clamping shaft 21 is arranged below the upper jacket 7 in the tilt direction Z.

The steering system 1 is not limited to a manual type steering system, in which steering of the steering member 2 is not assisted, but may be a column-assist electric power steering system (C-EPS) in which power of an electric motor is provided to the steering shaft 3 to assist steering of the steering member 2. The second energy absorbing portions 136 in the third modification need not necessarily include the third portions 136d. When the third portions 136d are omitted from the second energy absorbing portions 136, the second energy absorbing portions 136 are deformed only by bending without being torn away when the secondary collision occurs with the engaging protrusion 140 located in the engagement position.

The steering system 1 in the third modification may be configured not to include the first energy absorbing unit 120.

What is claimed is:

1. A steering system comprising:
    a steering shaft that is configured to contract and extend in a column axial direction;
    a column jacket that includes a lower jacket and an upper jacket fitted to the lower jacket and that supports the steering shaft so that the steering shaft is rotatable, the column jacket being configured to contract and extend in the column axial direction;
    a first tooth defining member having a plurality of first teeth such that the first teeth are arranged in the column axial direction, the first tooth defining member moving together with the upper jacket;
    a support shaft that is supported by the lower jacket or a member supported by the lower jacket and that extends in an orthogonal direction orthogonal to the column axial direction;
    a second tooth defining member that has second teeth configured to come into meshing engagement with the first teeth, that is supported by the support shaft so as to be rotatable around a central axis of the support shaft, and that is detached, at a time of a secondary collision, from the lower jacket with the second teeth kept in meshing engagement with the first teeth; and
    an energy absorbing unit including a pair of energy absorbing portions each including a restraining portion restrained in the column axial direction by the lower jacket, a first portion extending upward from the restraining portion in the column axial direction, a fold-back portion, and a second portion formed by folding back the energy absorbing portion at the fold-back portion, the energy absorbing portions being separated from each other in the orthogonal direction, and a coupling portion that couples the second portions of the energy absorbing portions together and that moves together with the second tooth defining member at the time of the secondary collision, wherein at the time of the secondary collision, the energy absorbing portions allow the fold-back portions to move downward in the column axial direction to absorb impact energy while guiding downward movement of the second tooth defining member in the column axial direction between facing edges of the energy absorbing portions.

2. The steering system according to claim 1, wherein the support shaft is supported between the first portion and the second portion of each of the energy absorbing portions of the energy absorbing unit, the energy absorbing portions serving as the member supported by the lower jacket, and at the time of the secondary collision, the support shaft guides parallel movement of the second portion with respect to the first portion.

3. The steering system according to claim 1, wherein the first portion of each of the energy absorbing portions includes an inclined portion inclined with respect to the orthogonal direction and allowing bending rigidity to be enhanced.

4. The steering system according to claim 1, further comprising:

an engaging protrusion supported by the lower jacket;

a second energy absorbing unit including a moving portion that moves together with the second tooth defining member at the time of the secondary collision, an engaged portion with which the engaging protrusion engages, and a second energy absorbing portion that is deformed by movement of the moving portion with respect to the engaged portion to absorb impact energy generated at the time of the secondary collision; and a driving mechanism that advances the engaging protrusion toward an engagement position where the engaging protrusion engages with the engaged portion and that retracts the engaging protrusion toward an engagement released position where engagement with the engaged portion is released.

* * * * *